United States Patent
Xu et al.

(10) Patent No.: US 11,539,441 B1
(45) Date of Patent: Dec. 27, 2022

(54) CHIRP-COMPENSATING TRANSMITTER AND METHOD

(71) Applicant: CABLE TELEVISION LABORATORIES, INC., Louisville, CO (US)

(72) Inventors: Mu Xu, Broomfield, CO (US); Junwen Zhang, Shanghai (CN); Haipeng Zhang, Broomfield, CO (US); Zhensheng Jia, Superior, CO (US); Luis Alberto Campos, Superior, CO (US); Curtis D. Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/219,563

(22) Filed: Mar. 31, 2021

Related U.S. Application Data

(63) Continuation-in-part of application No. 17/162,838, filed on Jan. 29, 2021.

(60) Provisional application No. 63/002,525, filed on Mar. 31, 2020, provisional application No. 62/967,122, filed on Jan. 29, 2020.

(51) Int. Cl.
*H04B 10/516* (2013.01)
*H04B 10/2513* (2013.01)

(52) U.S. Cl.
CPC ..... *H04B 10/516* (2013.01); *H04B 10/25137* (2013.01)

(58) Field of Classification Search
CPC .......... H04B 10/516; H04B 10/25137
USPC ....................................... 398/186
See application file for complete search history.

(56) References Cited

U.S. PATENT DOCUMENTS

| | | | |
|---|---|---|---|
| 3,909,061 A | 9/1975 | Johnson | |
| 5,115,440 A * | 5/1992 | Gysel | H04B 10/25137 372/38.08 |
| 5,373,382 A * | 12/1994 | Pirio | H04B 10/25137 385/27 |
| 5,691,989 A * | 11/1997 | Rakuljic | H01S 5/141 359/22 |
| 5,699,179 A * | 12/1997 | Gopalakrishnan | H04N 7/22 359/239 |
| 5,761,638 A * | 6/1998 | Knittle | H04M 3/493 379/406.03 |
| 5,793,512 A * | 8/1998 | Ryu | H04B 10/2935 398/180 |
| 5,974,209 A * | 10/1999 | Cho | H04B 10/2507 385/27 |
| 5,991,323 A * | 11/1999 | Adams | H04B 10/58 372/38.07 |
| 7,023,601 B2 | 4/2006 | McGhan et al. | |

(Continued)

*Primary Examiner* — Abbas H Alagheband

(74) *Attorney, Agent, or Firm* — Lathrop GPM LLP

(57) ABSTRACT

A method for laser chirp precompensation includes modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal. The method also includes modulating a phase of the amplitude-modulated optical signal in response to a phase of one of (i) the chirp-compensated signal and (ii) a second signal derived from the chirp-compensated signal to yield a chirp-compensated optical signal.

27 Claims, 18 Drawing Sheets

(56) References Cited

U.S. PATENT DOCUMENTS

| | | | | |
|---|---|---|---|---|
| 7,848,661 B2* | 12/2010 | Iannelli | H04B 10/54 | 398/186 |
| 8,027,593 B2* | 9/2011 | Zhou | H04B 10/504 | 398/198 |
| RE44,647 E* | 12/2013 | Iannelli | H04B 10/58 | 398/186 |
| 9,559,778 B2 | 1/2017 | McNicol et al. | | |
| 2005/0281298 A1* | 12/2005 | Kupershmidt | H01S 5/147 | 372/34 |
| 2006/0078336 A1* | 4/2006 | McNicol | H04B 10/25137 | 398/147 |
| 2006/0078338 A1* | 4/2006 | Johnson | H04B 10/504 | 398/187 |
| 2006/0210282 A1* | 9/2006 | Iannelli | H04B 10/505 | 398/186 |
| 2008/0193144 A1* | 8/2008 | Zhou | H04B 10/504 | 398/192 |
| 2009/0123153 A1 | 5/2009 | Edirisinghe et al. | | |
| 2010/0034542 A1* | 2/2010 | Armstrong | H04B 10/548 | 398/158 |
| 2010/0128744 A1* | 5/2010 | Deladurantaye | H01S 3/06754 | 372/6 |
| 2011/0261845 A1* | 10/2011 | Ishaug | H01S 5/06213 | 372/38.02 |
| 2013/0136449 A1* | 5/2013 | Liu | H04B 10/25137 | 398/147 |
| 2014/0369694 A1* | 12/2014 | Turitsyn | H04B 10/25133 | 398/159 |
| 2015/0104196 A1* | 4/2015 | Bae | H04B 10/25137 | 398/193 |
| 2016/0308664 A1* | 10/2016 | Ishaug | H04L 7/0075 | |
| 2018/0076887 A1* | 3/2018 | Roberts | H04B 10/508 | |
| 2020/0099449 A1 | 3/2020 | Way et al. | | |

\* cited by examiner

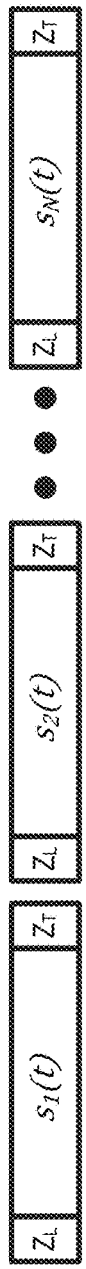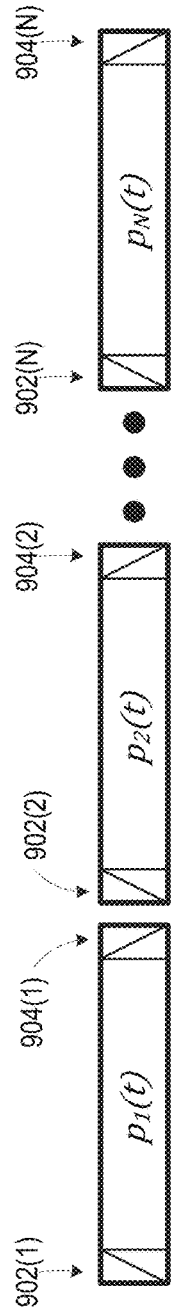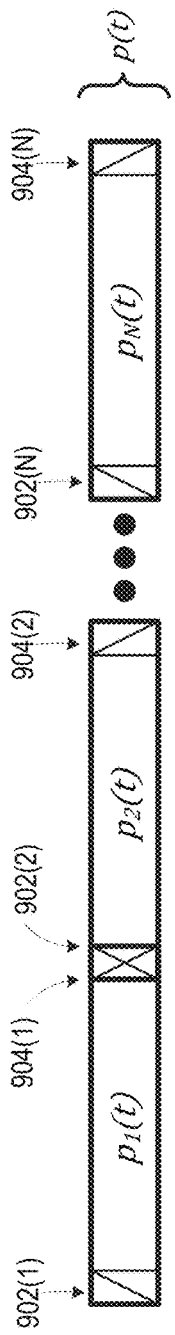

2300 ⇘

┌─────────────────────────────────────────────────────────────────────────┐
│ 2310                                                                    │
│ Modulate a laser with a real-valued double-side-band orthogonal         │
│ frequency-domain multiplexed (OFDM) signal to yield a characterization  │
│ optical signal that includes a plurality of subcarriers each including  │
│ a respective transmitted amplitude and a respective transmitted phase.  │
└─────────────────────────────────────────────────────────────────────────┘
                                    ▼
┌─────────────────────────────────────────────────────────────────────────┐
│ 2320                                                                    │
│ Transmit the characterization optical signal to a coherent receiver via │
│ a fiber-optic cable;                                                    │
└─────────────────────────────────────────────────────────────────────────┘
                                    ▼
┌─────────────────────────────────────────────────────────────────────────┐
│ 2330                                                                    │
│ Receive, at the coherent receiver, the characterization optical signal  │
│ as a chirped-modulated optical signal.                                  │
└─────────────────────────────────────────────────────────────────────────┘
                                    ▼
┌─────────────────────────────────────────────────────────────────────────┐
│ 2340                                                                    │
│ Demodulate the chirped-modulated optical signal to obtain, for each     │
│ subcarrier, a respective received amplitude and a respective received   │
│ phase.                                                                  │
└─────────────────────────────────────────────────────────────────────────┘
                                    ▼
┌─────────────────────────────────────────────────────────────────────────┐
│ 2350                                                                    │
│ For each subcarrier, (i) determine a respective chirp-response          │
│ amplitude as a ratio of the respective received amplitude to the        │
│ respective transmitted amplitude, and (ii) determine a respective       │
│ chirp-response phase as a difference between the respective received    │
│ phase to the respective transmitted phase.                              │
└─────────────────────────────────────────────────────────────────────────┘

FIG. 23 ical patent

CHIRP-COMPENSATING TRANSMITTER AND METHOD

RELATED APPLICATIONS

This application claims benefit of priority to U.S. Provisional Patent Application Ser. No. 63/002,525, filed on Mar. 31, 2020, which is incorporated herein by reference. This application is also a continuation-in-part of U.S. patent application Ser. No. 17/162,898, filed on Jan. 29, 2021, which claims priority to U.S. Provisional Patent Application Ser. No. 62/967,122, filed on Jan. 29, 2020, the disclosure of which is incorporated herein by reference in its entirety.

BACKGROUND

Communication network traffic continues to grow, such as due to emergence of new services with high bandwidth demand, including data center interconnection services, fifth generation (5G) wireless broadband services, and virtual reality services. Optical communication networks, which use fiber-optic cable to transmit data between network nodes, are increasingly being used for data transmission, due to their inherent capability to support high bandwidth and to transport data over long distances.

In an optical communication network, data is modulated onto an optical carrier generated by a laser to yield a modulated optical signal. One modulation scheme is direct modulation, in which the current driving the laser is modulated according to the content of the transmitted data. Direct modulation changes the refractive index of the material forming the laser's cavity, which results in a distortion of the modulated optical signal known is laser chirp.

SUMMARY OF THE EMBODIMENTS

In a first aspect, a method for laser chirp precompensation is disclosed. The method includes modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal. The method also includes modulating a phase of the amplitude-modulated optical signal in response to a phase of one of (i) the chirp-compensated signal and (ii) a second signal derived from the chirp-compensated signal to yield a chirp-compensated optical signal.

In a second aspect, a method of determining a chirp-response function of a laser is disclosed. The method includes the following steps (a)-(e). Step (a) includes modulating the laser with a real-valued double-side-band orthogonal frequency-domain multiplexed (OFDM) signal to yield a characterization optical signal that includes a plurality of subcarriers each including a respective transmitted amplitude and a respective transmitted phase. Step (b) includes transmitting the characterization optical signal to a coherent receiver via a fiber-optic cable. Step (c) includes receiving, at the coherent receiver, the characterization optical signal as a chirped-modulated optical signal. Step (d) includes demodulating the chirped-modulated optical signal to obtain, for each subcarrier of the plurality of subcarriers, a respective received amplitude and a respective received phase. Step (e) includes for each subcarrier of the plurality of subcarriers, (i) determining a respective chirp-response amplitude of a plurality chirp-response amplitudes of the chirp-response function as a ratio of the respective received amplitude to the respective transmitted amplitude, and (ii) determining a respective chirp-response phase of a plurality chirp-response phases of the chirp-response function as a difference between the respective received phase to the respective transmitted phase.

In a third aspect, chirp-compensating transmitter includes a signal generator, a laser, and a phase modulator. The signal generator is configured to distort an original modulated signal according to an inverse of a chirp-response function of a laser, to yield a chirp-compensated signal. The laser is configured to modulate an amplitude of an optical signal in response to an amplitude of one of (i) the chirp-compensated signal and (ii) a first signal derived therefrom, to yield an amplitude-modulated optical signal. The phase modulator is disposed downstream of the laser with respect to the optical signal, and is configured to modulate a phase of the amplitude-modulated optical signal in response to a phase of one of (i) the chirp-compensated signal and (ii) a second signal derived therefrom.

BRIEF DESCRIPTION OF THE FIGURES

FIGS. 9A-9F are block diagrams collectively illustrating a method performed by some other embodiments of the signal generator of the FIG. 6 optical communication network for generating a compensated signal.

FIG. 23 is a flowchart illustrating method for measuring a chirp-response of a laser, in an embodiment.

DETAILED DESCRIPTION OF THE EMBODIMENTS

One promising communication network architecture for meeting growing data transmission needs is an optical communication network including single-polarized direct-detected (DD) high speed transceivers and implementing wavelength division multiplexing. This communication network architecture is relatively simple and economical compared to other optical communication network architectures, which makes it a strong candidate for many communication network applications.

Figure 1:
FIG. 1 is a graph of power versus time of a transmitting laser of a simulated optical communication network.
Figure 2:
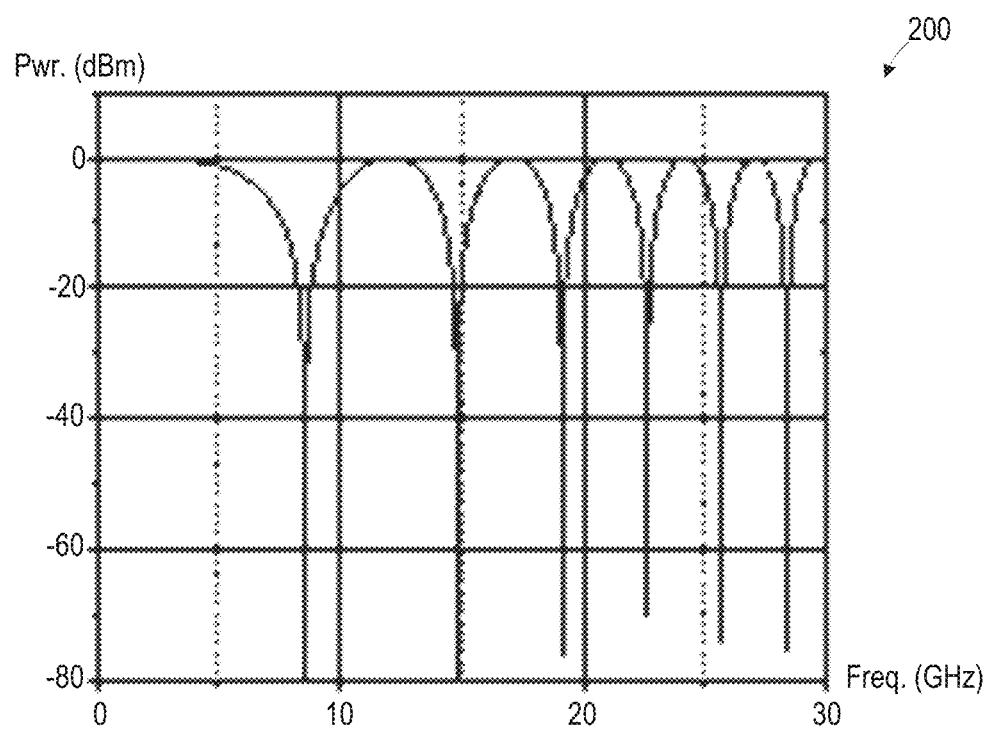
FIG. 2 is a graph of power versus frequency of a signal of the simulated optical communication network after transmission of the signal via a fiber-optic cable and detection of the signal by a receiver.

However, conventional long-distance communication networks including DD high speed transceivers suffer from chromatic dispersion (CD) induced power fading, which significantly limits bandwidth and maximum fiber-optic cable distance. Chromatic dispersion is a phenomenon where different wavelengths of light traveling through a fiber-optic cable arrive at a common destination at different times. To help understand the effects of chromatic dispersion on an optical communication network, consider FIGS. 1-5, which are based on a simulated optical communication network using DD transceivers and implementing four levels of pulse-amplitude-modulation (PAM4). FIG. 1 is a graph 100 of power versus time of a transmitting laser of the simulated optical communication network, illustrating that the laser has four possible power output levels, $P_1$, $P_2$, $P_3$, and $P_4$. Each output power level is offset from an adjacent power level by a difference in power of $\Delta P$. FIG. 2 is a graph 200 of power versus frequency of a signal of the simulated optical communication network, after transmission of the signal via a fiber-optic cable and detection of the signal by a receiver. As evident from FIG. 2, the received signal does not have a flat response but instead has notches at several frequencies. The notches are caused by chromatic dispersion of the signal when traveling through the fiber-optic cable.

Figure 3:
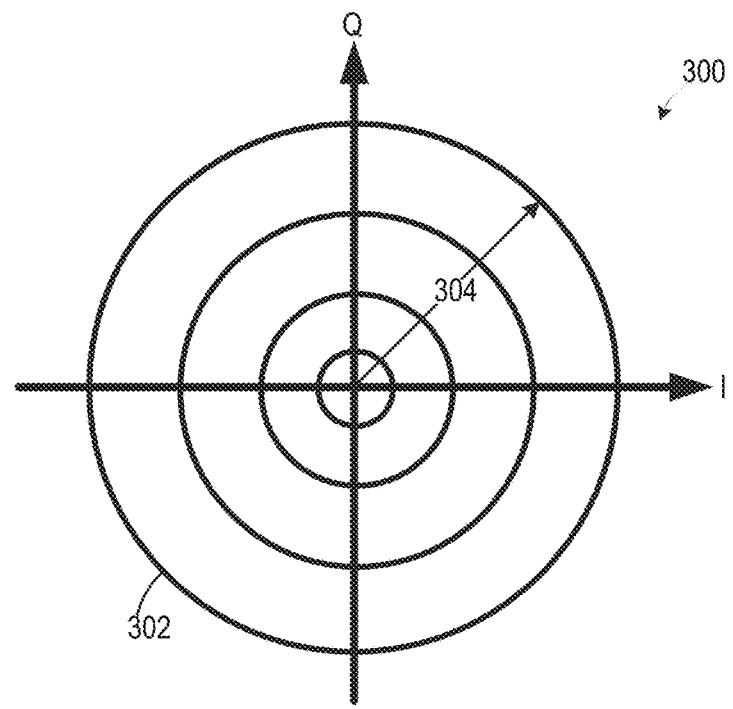
FIG. 3 illustrates possible distributions of a received signal in the simulated optical communication network.

The received signal in the simulated communication network has a complex value which can be represented by a graph 300 of FIG. 3, which illustrates possible distributions of the received signal in an in-phase (I) plane and a quadrature (Q) plane. The received signal can be located at any position on any one of four rings 302, depending on its amplitude and phase. Only one instance of ring 302 is labeled in FIG. 3 for illustrative clarity. It should be noted that while adjacent power outputs of the laser are offset by a uniform difference in power of $\Delta P$, as illustrated in FIG. 1, adjacent amplitude levels are offset by non-uniform differences in amplitude, as illustrated in FIG. 3 by separation of adjacent rings 302 in a radial direction 304 being non-uniform. This non-uniformity of radial separation of rings 302 results from the relationship between signal power and amplitude, where signal amplitude is the square root of signal power.

Figure 4:
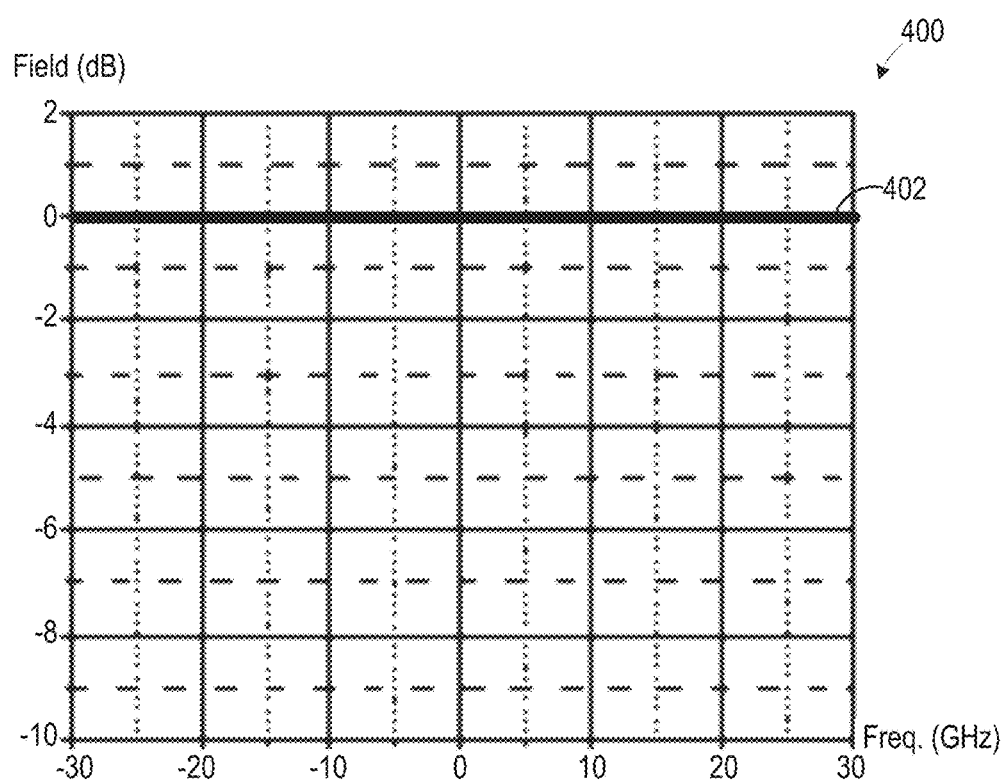
FIG. 4 is a graph of optical field amplitude of a signal in the simulated optical communication network after transmission through the network.
Figure 5:
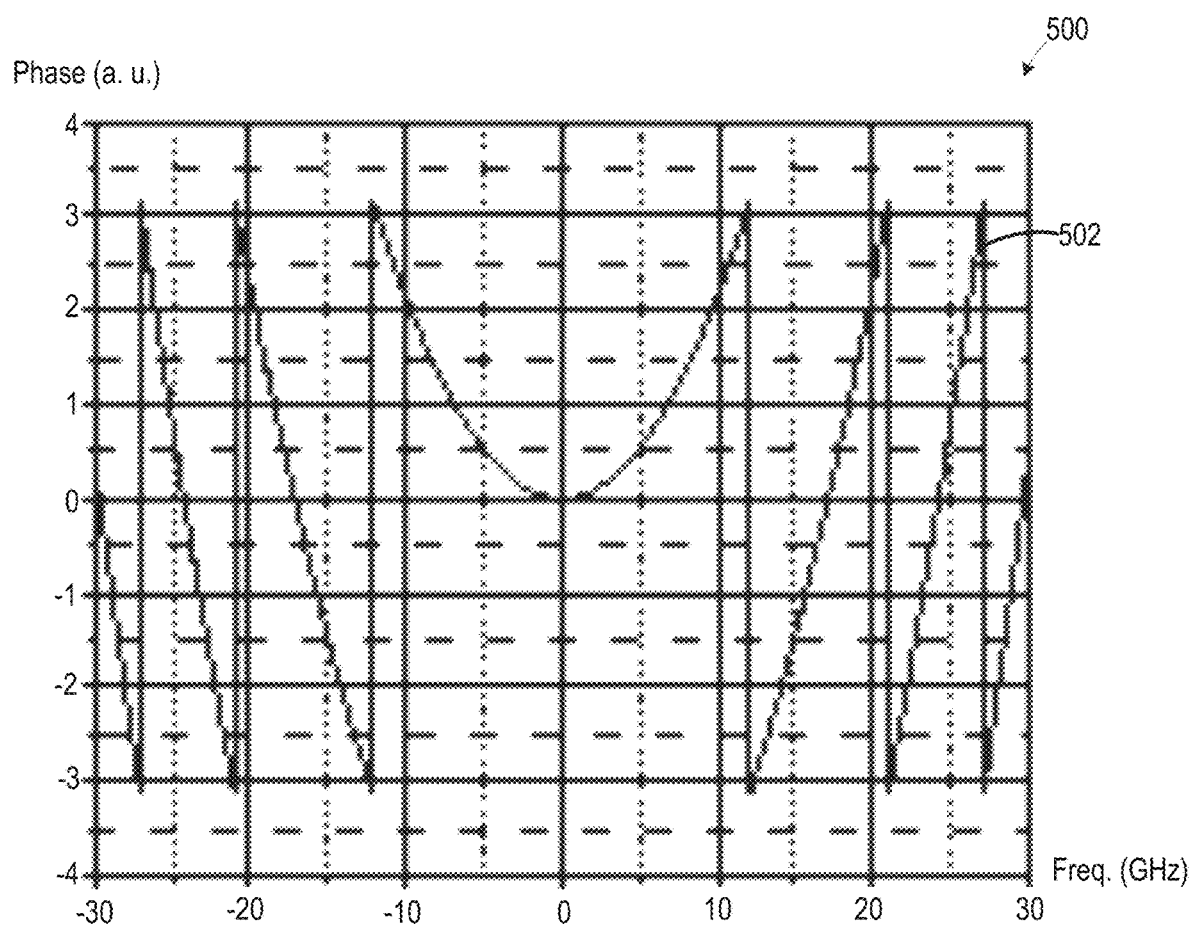
FIG. 5 is a graph of optical field phase of a signal in the simulated optical communication network after transmission through the network.

FIG. 4 is a graph 400 of optical field amplitude, and FIG. 5 is a graph 500 of optical field phase in arbitrary units (a. u.), of a signal in the simulated optical communication network after transmission through the network. A curve 402 of FIG. 4 illustrates that the amplitude is flat, i.e., that the amplitude of the transmitted signal does not materially vary with frequency. A curve 502 of FIG. 5, in contrast, illustrates that phase of the transmitted signal varies significantly with frequency, due to chromatic dispersion in the fiber-optic cable. Accordingly, chromatic dispersion causes the fiber-optic cable to behave like an all-pass filter, which does not directly affect signal amplitude but significantly affects signal phase, as illustrated in FIGS. 4 and 5. While the distortion in phase caused by chromatic distortion does not directly affect signal amplitude, the distortion in phase affects signal power, as illustrated in FIG. 2.

Effects of chromatic dispersion on a transmitted signal may make it difficult, or even essentially impossible, to recover information, such as a payload, from the signal. Single-side band (SSB) modulation may be used to mitigate effects of chromatic dispersion, and use of SSB modulation may therefore extend maximum transmission distance of an optical communication network. Nevertheless, single-side band modulation does not eliminate power fading caused by chromatic dispersion, and single-side band modulation leads to signal-to-signal beating interference, which degrades signal quality. Additionally, single-side band modulation reduces receiving sensitivity from loss of power associated with eliminating one side band. Chromatic dispersion can also be mitigated by pre-compensation at a transmitter-side IQ-modulator, but this pre-compensation scheme induces high insertion loss and requires complex and costly bias control.

Disclosed herein systems and methods for chromatic dispersion pre-compensation (CDPC) which at least partially overcome drawbacks of conventional techniques for mitigating chromatic dispersion. Certain embodiments include a phase modulator (PM) cascaded with a laser that is a directly-modulated laser (DML), such as a directly-modulated coherent-optical-injection locked (COIL) laser or OFFT, to realize full-field light modulation. The new systems and methods achieve chromatic pre-compensation by a combination of intensity and phase modulations, thereby potentially significantly extending maximum communication system transmission distance, while achieving significant advantages. For example, use of a phase modulator to achieve phase modulation, instead of an IQ-modulator, relaxes bias control requirements and reduces insertion losses. Additionally, a low-cost, intensity-modulated distributed feedback (DFB) laser can be used as a light source in the new systems. Accordingly, the new systems and methods may be more economical and more efficient than conventional systems and methods. Additionally, the new systems and methods are compatible with optical injection locking subsystems. Moreover, the new systems and methods may extend usable transmission light wavelengths when used in passive optical network (PON) applications. Specifically, a PON is typically configured such that uplink transmission light wavelength is limited to the O band (1260 nm-1360 nm), to avoid chromatic dispersion penalties. Use of the new systems and methods in a PON, however, may sufficiently mitigate chromatic dispersion such that additional bands, such as the C band, can be used, thereby significantly expanding PON capacity and/or flexibility.

Figure 6:
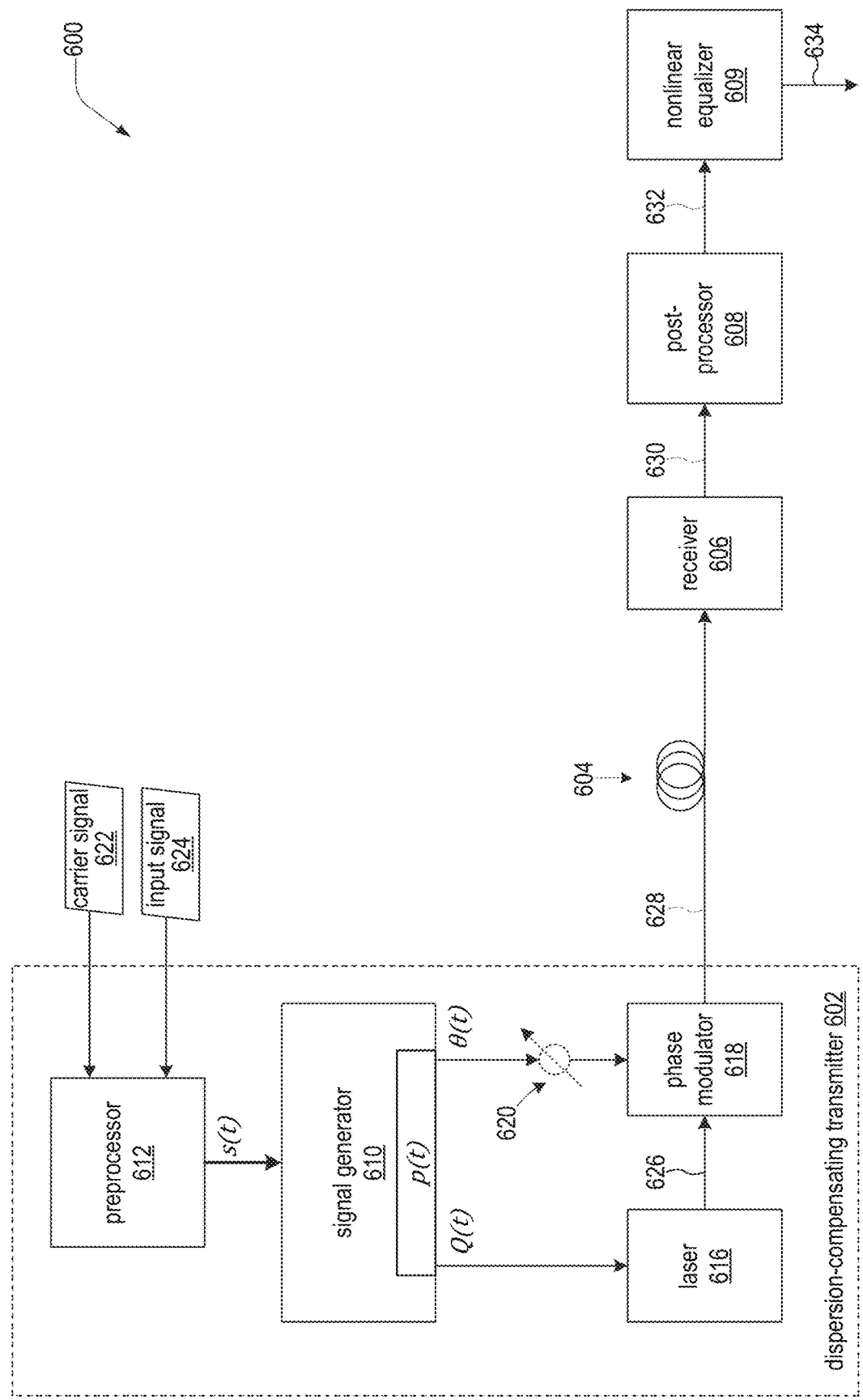
FIG. 6 is a block diagram of an optical communication network including a transmitter system configured to implement chromatic dispersion pre-compensation, according to an embodiment.

FIG. 6 is a block diagram of an optical communication network 600 including a dispersion-compensating transmitter 602 configured to implement chromatic dispersion pre-compensation, as well as a fiber-optic cable 604, a receiver 606, a post-processor 608, and an optional non-linear equalizer 609. Fiber-optic cable 604 communicatively couples dispersion-compensating transmitter 602 and receiver 606, and post-processor 608 is communicatively coupled to an output of receiver 606. Optical non-linear equalizer 609, when present, is communicatively coupled to an output of post-processor 608. Fiber-optic cable 604 may be replaced with a free-space optical transmission system without departing from the scope hereof.

Dispersion-compensating transmitter 602 includes a pre-processor 612, a signal generator 610, a laser 616, a phase modulator 618, and, in embodiments, a tunable delay line 620. Although the elements of dispersion-compensating transmitter 602 are illustrated as being separate elements, two or more of these elements could be at least partially combined without departing from the scope hereof. For example, in some embodiments, preprocessor 612 and signal generator 610 are embodied by a common processor executing instructions in the form of software and/or firmware. Additionally, all elements of dispersion-compensating transmitter 602 need not be disposed in the same location. For example, preprocessor 612 and signal generator 610 could be remote from laser 616 and phase modulator 618. Signal generator 610 may be a digital signal generator.

Preprocessor 612 is configured to modulate a carrier signal 622 by an input signal 624 to be transmitted by optical communication network 600 to generate an original modulated signal s(t). For example, some embodiments of preprocessor 612 are configured to modulate solely amplitude of carrier signal 622, such as by using a non-return-to-zero (NRZ) modulation format or a PAM4 modulation format. As another example, some embodiments of preprocessor 612 are configured to modulate both amplitude and phase of carrier signal 622, such as by using a quadrature phase shift keying (QPSK) modulation format or a 16-order quadrature amplitude modulation (16-QAM) modulation format. Signal generator 610 is configured to distort original modulated signal s(t) according to an inverse of a transmission function H of optical communication network 600, to generate a compensated signal p(t), which has an amplitude Q(t) and a phase θ(t). Transmission function H includes effects of chromatic dispersion by fiber-optic cable 604. Therefore, distorting original modulated signal s(t) according to an inverse of transmission function H advantageously at least substantially compensates for the chromatic dispersion, such that a signal received by receiver 606 will be at least substantially free of chromatic dispersion artifacts. Such intentional distortion of original modulated signal s(t) to compensate for chromatic dispersion in fiber-optic cable 604 may be referred to a "pre-compensation," since signals are compensated for chromatic dispersion before being transmitted through fiber-optic cable 604. In some embodiments, transmission function H may be determined from length and material of fiber-optic cable 604, such that transmission function His static. In some other embodiments, transmission function His determined in real time, or on a periodic basis, such that transmission function His dynamic. Several possible embodiments of signal generator 610 are discussed below with respect to FIGS. 7-9.

Signal generator 610 provides amplitude Q(t) of compensated signal p(t) to laser 616, and signal generator 610 provides phase θ(t) of compensated signal p(t) to phase modulator 618. Laser 616 is configured to generate an optical signal 626 and modulate amplitude of optical signal 626 in response to amplitude Q(t) of compensated signal p(t), such that laser 616 is controlled by amplitude Q(t). Accordingly, optical signal 626, as outputted by laser 616, includes amplitude information, but the optical signal does not include phase information. In some embodiments, laser 616 a directly-modulated laser (DML), such as a directly modulated coherent-optical injection-locked (COIL) laser or OFFT.

Phase modulator 618 is located downstream of laser 616 with respect to optical signal 626, and phase modulator 618 is configured to modulate a phase of optical signal 626 in response to a phase θ(t) of compensated signal p(t), to generate an optical signal 628 for transmission by fiber-optic cable 604 to receiver 606. Optical signal 628 includes both amplitude and phase information. It may be necessary for respective clocks of laser 616 and phase modulator 618 to be synchronized, or in other words, for the two clocks to match. Accordingly, some embodiments of dispersion-compensating transmitter 602 include tunable delay line 620 configured to synchronize the clock of phase modulator 618 with the clock of laser 616, by adding a delay to phase θ(t) of compensated signal p(t), before phase modulator 618 modulates phase of optical signal 626 according to phase θ(t).

Fiber-optic cable 604 is configured to transmit optical signal 628 from phase modulator 618 to receiver 606, and receiver 606 is configured to convert optical signal 628 into an electrical signal 630. Post-processor 608 is configured to recover input signal 624 from electrical signal 630 and thereby generate an output signal 632, such as by performing a demodulation technique appropriate for modulation performed by preprocessor 612. In the event that there is non-linear distortion on output signal 632, such as caused by pre-compensation performed by dispersion-compensating transmitter 602, optional non-linear equalizer 609 may be used to perform non-linear equalization of output signal 632 to generate a corrected output signal 634.

Possible applications of optical communication network 600 including transmitting data over a short distance, a medium distance, or a long distance. For example, optical communication network 600 could be used to transmit data within a data center, within a building, or even within a single networking appliance. As another example, optical communication network 600 could be part of an access network, including but not limited to, a PON. As yet another example, optical communication network 600 could be part of a long-distance data transmission network.

Figure 7:
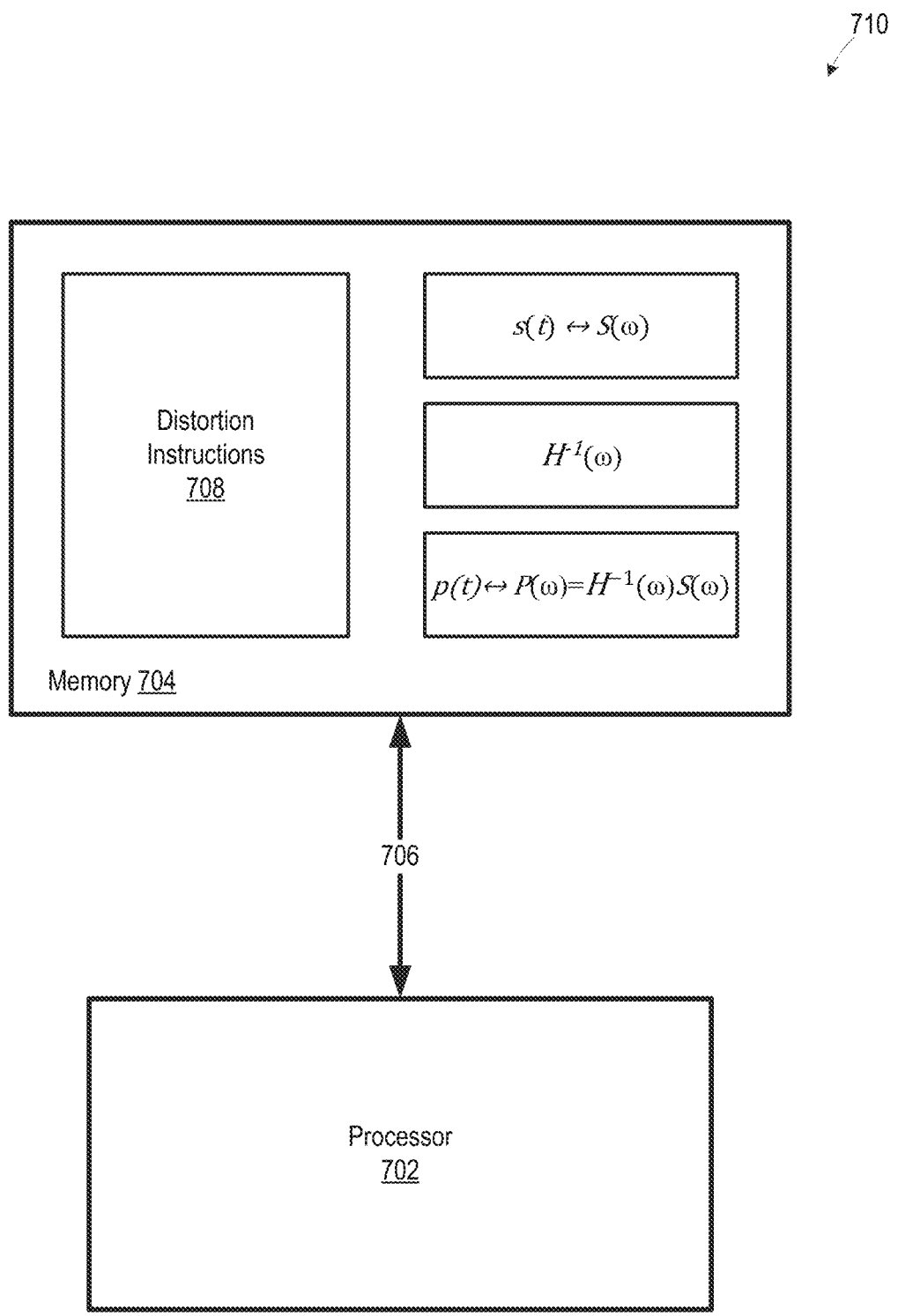
FIG. 7 is a block diagram of one possible embodiment of a signal generator of the FIG. 6 optical communication network.

FIG. 7 is a block diagram of a signal generator 710, which is one possible embodiment of signal generator 610 of FIG. 6, although it is understood that signal generator 610 is not limited to the FIG. 7 embodiment. Signal generator 710 includes a processor 702, a memory 704, and a communication bus 706 communicatively coupling processor 702 and memory 704. Memory 704 includes distortion instructions 708 in the form of software and/or firmware. Memory 704 also holds a copy of each of original modulated signal s(t), an inverse $H^{-1}$ of the network transmission function H, and compensated signal p(t). Processor 702 is configured to execute instructions 708 to generate compensated signal p(t) from original modulated signal s(t) and inverse $H^{-1}$ of the network transmission function H In some embodiments, instructions 708 are configured such that processor 702 generates compensated signal p(t) according to a method illustrated in FIG. 8 or a method illustrated in FIGS. 9A-9F (discussed below). Processor 702 may be configured to perform additional functions without departing from the scope hereof. For example, in some embodiments, memory 704 includes additional instructions (not shown) for processor 702 to generate original modulated signal s(t), such that signal generator 710 embodies preprocessor 612 as well as signal generator 610.

Figure 8:
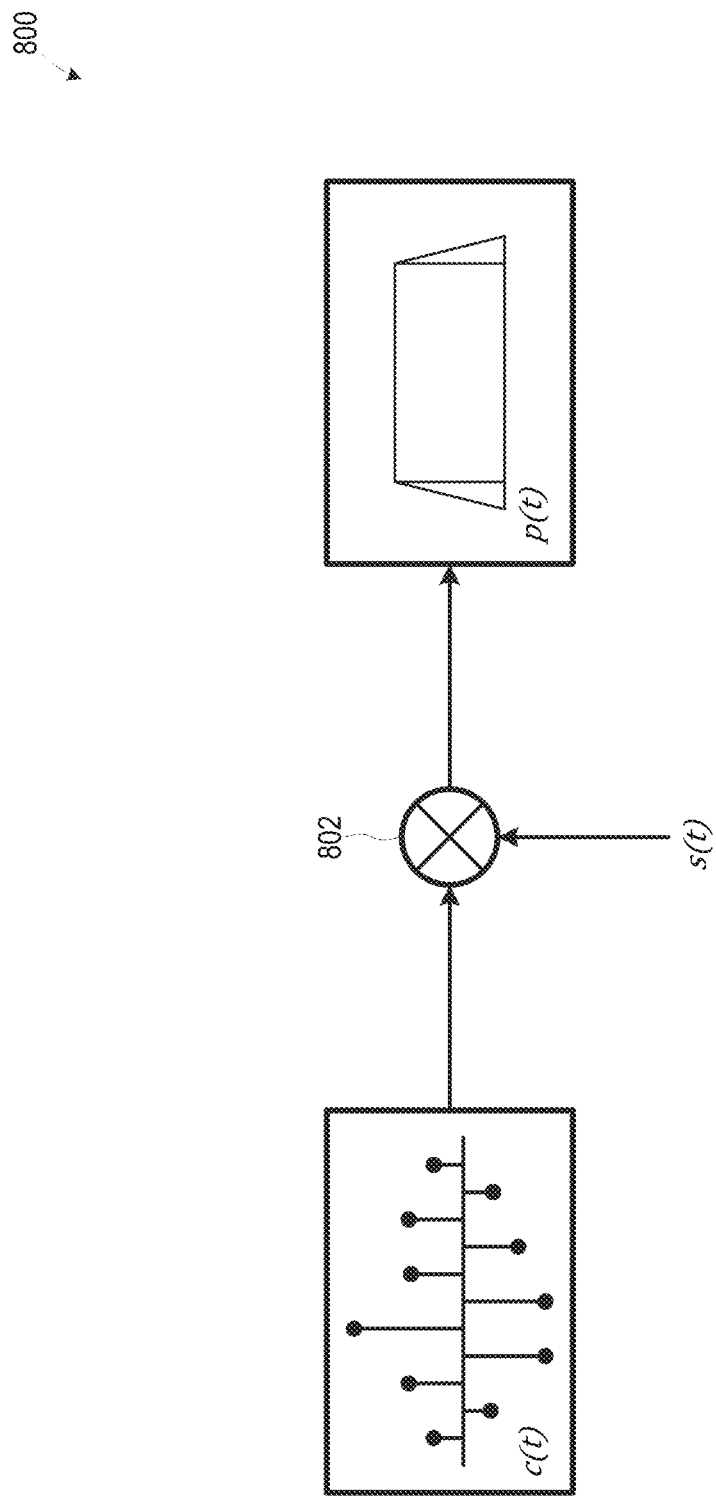
FIG. 8 is a block diagram illustrating a method performed by some embodiments of the signal generator of the FIG. 6 optical communication network for generating a compensated signal.

FIG. 8 is a block diagram 800 illustrating a method performed by some embodiments of signal generator 610 to generate compensated signal p(t). In the method illustrated in FIG. 8, signal generator 610 determines a time domain filter function c(t) by converting the inverse $H^{-1}$ of the network transmission function H from the frequency domain to the time domain, such as by using an inverse fast Fourier transform (IFFT). Signal generator 610 then convolves, using a convolution operation 802, original modulated signal s(t) with time domain filter function c(t) to generate compensated signal p(t). The method illustrated in FIG. 8 may be practical to implement in applications where a required number of taps in time domain filter function c(t) is less than 20, which is common in applications where fiber-optic cable 604 is relatively short, such as less than or equal to 40 Kilometers (Km). However, the FIG. 8 method may not be practical to implement in applications requiring a larger number of taps, due to large memory requirements and high computation complexity associated with convolution operation 802.

FIGS. 9A-9F are block diagrams collectively illustrating a method performed by some other embodiments of signal generator 610 to generate compensated signal p(t). The method begins with signal generator 610 dividing original modulated signal s(t) into N blocks $s_k(t)$, as illustrated in FIG. 9A, where N is an integer greater than one and k is an index ranging from 1 to N. Signal generator 610 then adds leading zeros $Z_L$ and trailing zeros $Z_T$ to each block $s_k(t)$, as illustrated in FIG. 9B. Signal generator 610 next converts each block $s_k(t)$ from a time domain to a frequency domain, such as by using a fast Fourier transform (FFT) technique, to generate frequency domain blocks $S_k(\omega)$, as illustrated in FIG. 9C. Signal generator 610 subsequently multiplies each frequency domain block $S_k(\omega)$ by the inverse $H^1(\omega)$ of the network transmission function H to obtain frequency domain filtered blocks $S_k(\omega)H^{-1}(\omega)$, as illustrated in FIG. 9D. Each frequency domain filtered block $S_k(\omega)H^{-1}(\omega)$ is subsequently converted to the time domain by signal generator 610 to yield time domain filtered blocks $p_k(t)$, as illustrated in FIG. 9E, such as by using an inverse fast Fourier transform technique.

Each time domain filtered blocks $p_k(t)$ includes a respective damping tail at the beginning and end of the block, caused by pulse expansion from the chromatic dispersion pre-compensation process. The leading and trailing zeros discussed above help mitigate effects of the damping tails, such that each damping tail is at least substantially encompassed by leading zeros or trailing zeros. Time domain filtered blocks $p_k(t)$ are labeled in FIG. 9E to show portions 902 associated with leading zeros and portions 904 associated with trailing zeros. In this document, specific instances of an item may be referred to by use of a numeral in parentheses (e.g. portion 902(1)) while numerals without parentheses refer to any such item (e.g. portions 902). Signal generator 610 subsequently partially overlaps and sums time domain filtered blocks $p_k(t)$ to obtain compensated signal p(t), as illustrated in FIG. 9F. Signal generator 610 overlaps time domain filtered blocks $p_k(t)$ such that for each pair of immediately adjacent time domain filtered blocks $p_k(t)$, a portion 904 of a first block of the pair associated with trailing zeros overlaps a portion 902 of a second block of the pair associated with leading zeros. For example, in pair of immediately adjacent time domain filtered blocks $p_1(t)$ and $p_2(t)$, portion of 904(1) of block $p_1(t)$ associated with trailing zeros overlaps portion 902(2) of block $p_2(t)$ associated with leading zeros.

The method illustrated in FIGS. 9A-9F may be more computationally efficient than the method illustrated in FIG. 8, and the method of FIGS. 9A-9F may therefore be particularly suitable for embodiments of communication network 600 where length of fiber-optic cable 604 is relatively long, such as greater than 40 Km. However, the method of FIGS. 9A-9F is more susceptible to data frame desynchronization than the FIG. 8 method, due to the block-wise signal processing techniques used in the FIGS. 9A-9F method.

Figure 10:
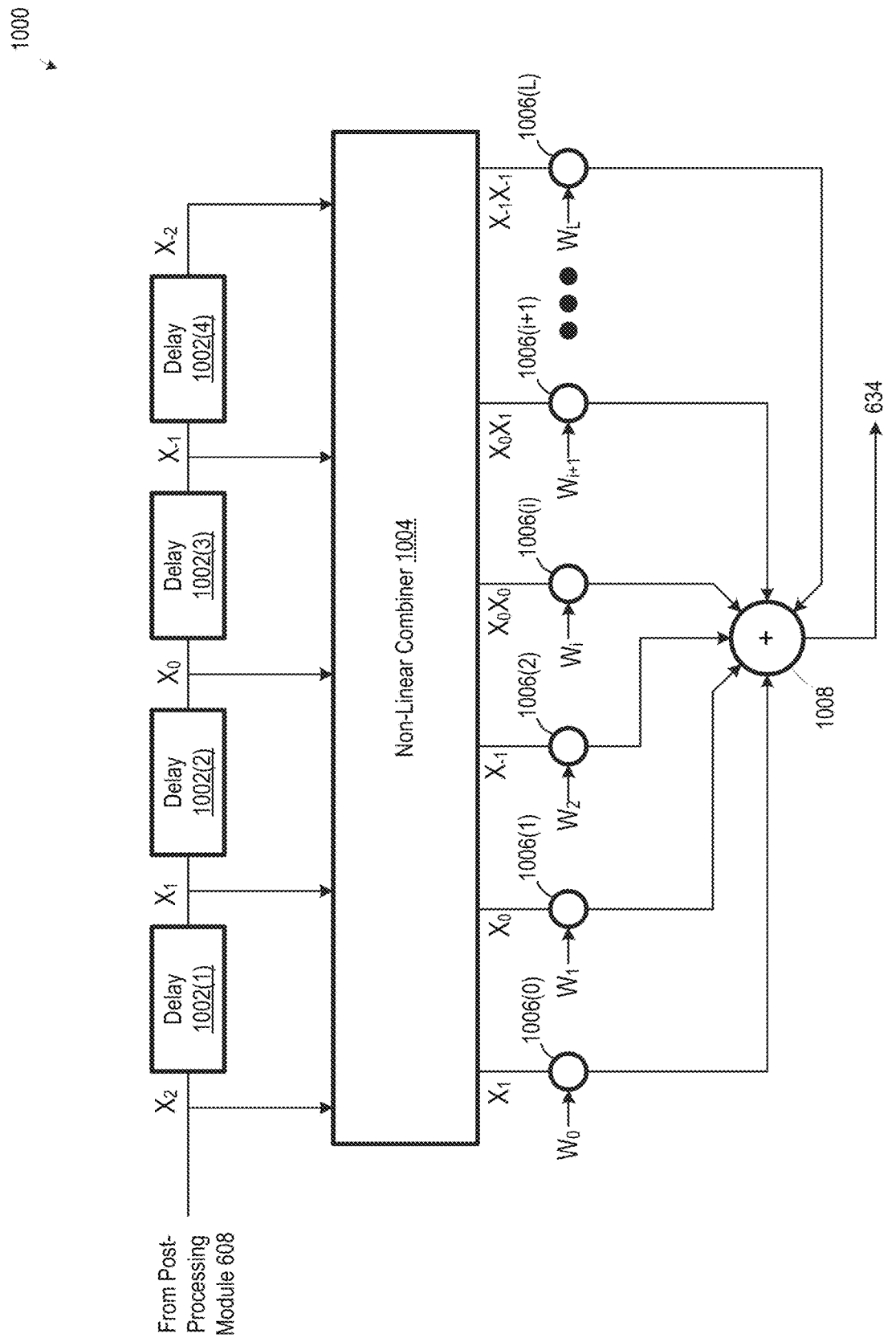
FIG. 10 is a block diagram of one possible embodiment of a non-linear equalizer of the FIG. 6 optical communication network.

FIG. 10 is a block diagram of a non-linear equalizer 1000, which is one possible embodiment of non-linear equalizer 609 of FIG. 6. Non-linear equalizer 1000 has a Volterra non-linear equalizer architecture and includes a plurality of delay taps 1002, a nonlinear combiner 1004, a plurality of tap weight modules 1006, and an addition module 1008. Tap weight modules 1006 are optionally adjusted to minimize a mean-square error between transmitted symbols and received symbols after digital filtering. In some embodiments, the elements of non-linear equalizer 1000 are embodied by a processor (not shown) executing instructions in the form of software and/or firmware stored in a memory (not shown).

Example Simulation Results

Figure 11:
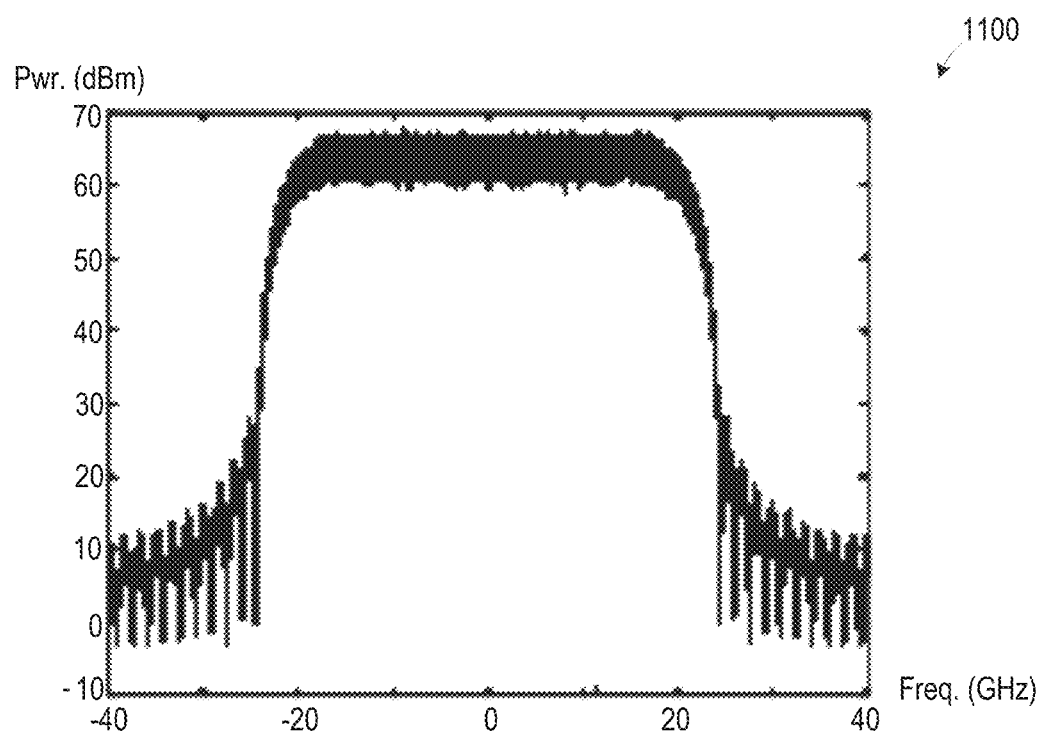
FIG. 11 is a graph of simulated signal power magnitude versus frequency of an original modulated signal of an embodiment of the FIG. 6 communication network.
Figure 12:
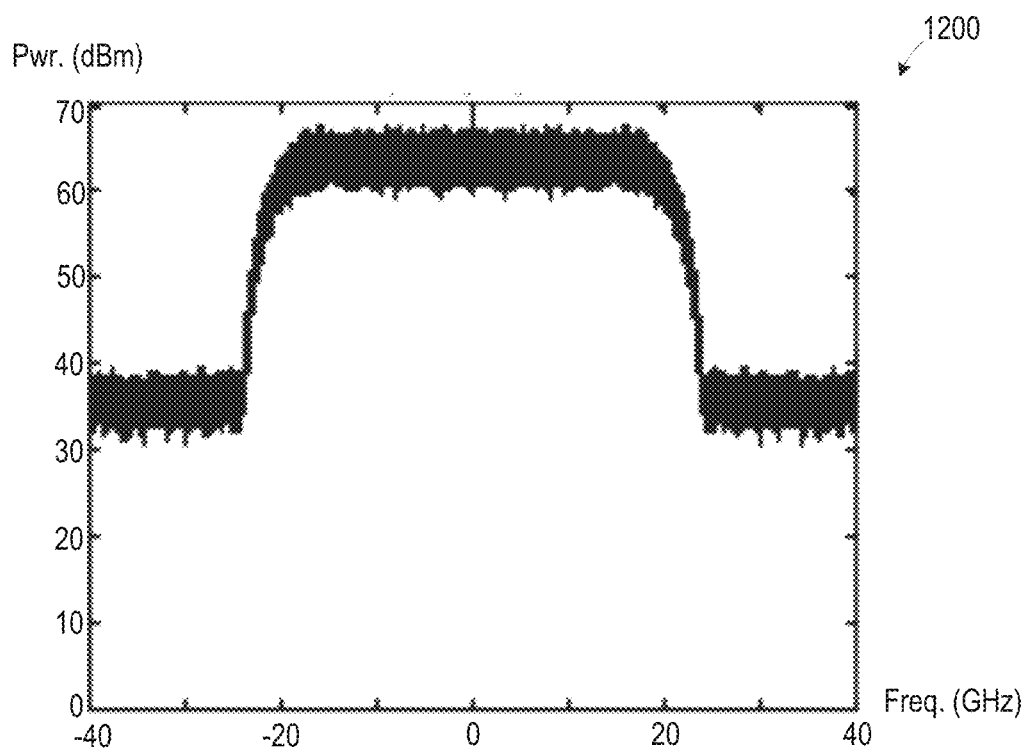
FIG. 12 is a graph of simulated signal power magnitude versus frequency of an output electrical signal of an embodiment of the FIG. 6 communication network.
Figure 13:
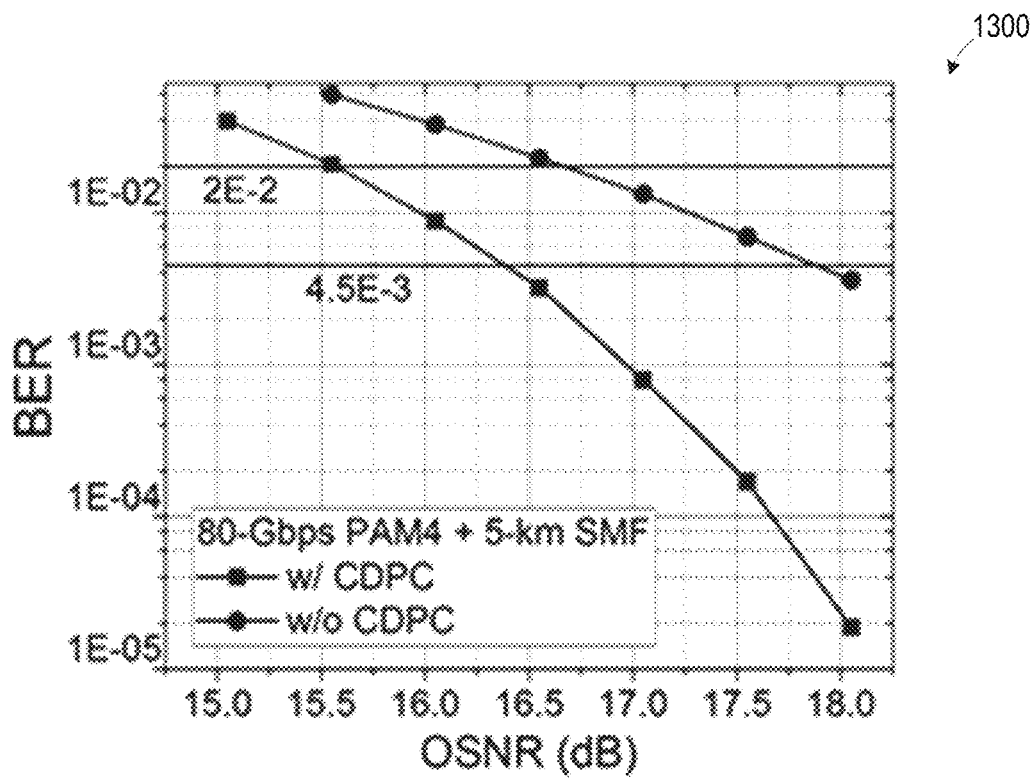
FIG. 13 is a graph of a bit error rate versus optical signal to noise ratio of two communication networks.

Discussed below with respect to FIGS. 11-13 are simulation results of several embodiments of communication network 600. It is appreciated, though, that communication network 600 need not necessarily perform as indicated in these simulation results. To the contrary, performance of communication network 600 will vary depending on the specific configuration and operating conditions of the communication network.

FIG. 11 is a graph 1100 of simulated signal power magnitude versus frequency of original modulated signal s(t), and FIG. 12 is a graph 1200 of simulated signal power magnitude versus frequency of output electrical signal 630 from receiver 606. In these simulations, preprocessor 612 is configured to modulate carrier signal 622 at a rate of 40 Giga Baud (GBaud) per second, fiber-optic cable 604 is a five-kilometer long single-mode fiber fiber-optic cable, and (c) signal generator 610 is configured to implement the method illustrated in FIGS. 9A-9F. It should be appreciated that the response of FIG. 12 has a similar shape to that of FIG. 11, thereby showing that this embodiment of communication network 600 compensates for chromatic distortion. The performance of communication network 600 can be further appreciated by comparing FIG. 12 to FIG. 2, where the response of FIG. 12 does not include the notches from chromatic dispersion that are present in the FIG. 2 response.

FIG. 13 is a graph 1300 of simulated bit error rate (BER) versus optical signal to noise ratio (OSNR) of two communication networks. The first communication network, corresponding to the curve labeled "w/CDPC", is an embodiment of communication network 600 where (a) preprocessor 612 is configured to modulate carrier signal 622 at a rate of 40 GBaud per second using PAM4 and (b) fiber-optic cable 604 is five-kilometer long single-mode fiber fiber-optic cable.

The second communication network, corresponding to the curve labeled "w/o CDPC" is like the embodiment of communication network 600 described immediately above but with without CDPC capability. FIG. 13 also includes lines respectively representing BER thresholds of $2 \times 10^{-2}$ and $4.5 \times 10^{-3}$. It can be determined from FIG. 13 that a OSNR penalty is improved by 1 dB and 1.5 dB, respectively, by the CDPC capabilities of communication network 600.

Further Examples

Figure 14:
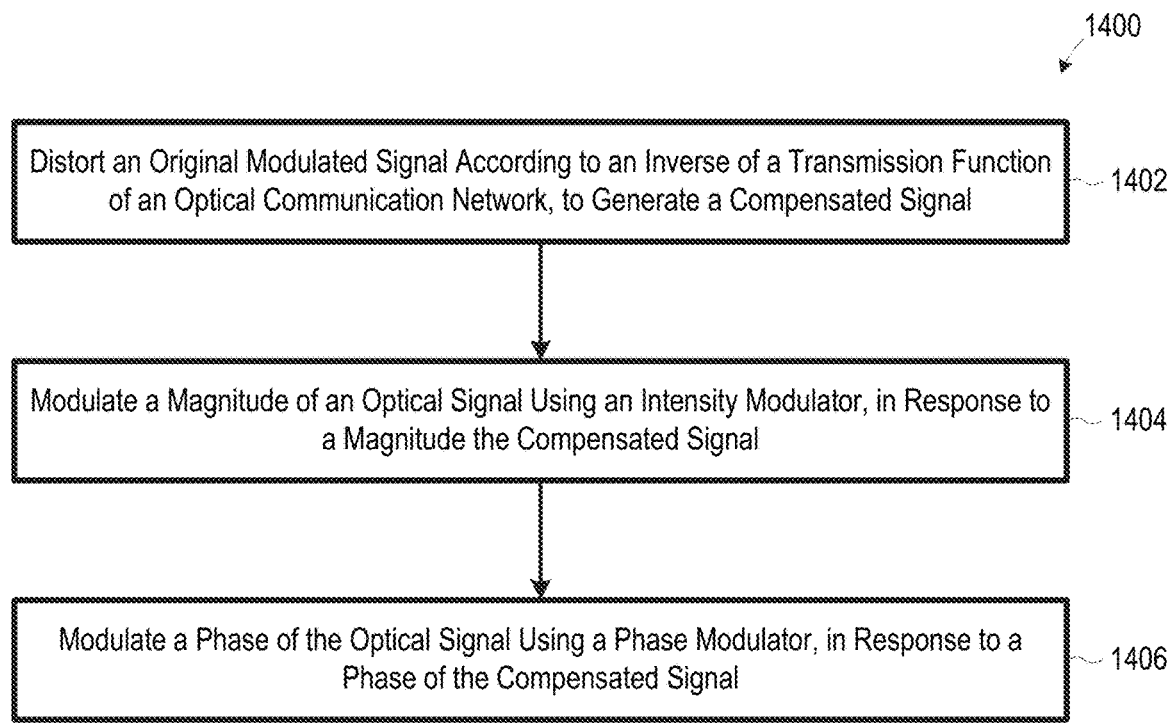
FIG. 14 is a flow chart of a method for chromatic dispersion pre-compensation in an optical communication network, in an embodiment.

Discussed below with respect to FIG. 14 are additional examples of operation of communication network 600. It is appreciated however, that communication network 600 is not limited to operating according to these examples.

FIG. 14 is a flow chart of a method 1400 for chromatic dispersion pre-compensation in an optical communication network. In a block 1402 of method 1400, an original modulated signal is distorted according to an inverse of a transmission function of the optical communication network to generate a compensated signal. In one example block 1402, signal generator 610 distorts original modulated signal s(t) according to an inverse of transmission function H to generated compensated signal p(t). In a block 1404 of method 1400, a magnitude of an optical signal is modulated using an intensity modulator, in response to magnitude of the compensated signal. In one example of block 1404, laser 616 modulates a magnitude of optical signal 626 in response to a magnitude Q(t) of compensated signal p(t). In a block 1406 of method 1400, a phase of the optical signal is modulated using a phase modulator, in response to a phase of the compensated signal, after modulating magnitude of the optical signal. In one example of block 1406, phase modulator 618 modulates phase of optical signal 628 in response to phase θ(t) of compensated signal p(t).

Laser Chirp Compensation

Continuously increased demands on broadband access networks, 5G mobile backhaul, and virtual-reality entertainment impose a stricter requirement on capacity for future optical access and transport networks. Meanwhile, the high cost of coherent optical transceivers remains to be a limitation. Embodiments thus far disclosed include integrating a cascaded directly modulated laser (DML) and phase modulator (PM) as an optical full-field transmitter (OFFT) to replace the traditional laser-plus-external-modulator platform in coherent optical transmitter site. Compared to the later scheme, an OFFT could significantly reduce the cost and insertion loss of the system, which makes it a promising solution for future low-cost high-speed coherent optical transmitter.

Embodiments disclosed above describe a technique to pre-compensate the fiber chromatic dispersion in an OFFT, which increases the transmission distance of the optical signal sent out by an OFFT. However, the impacts from laser chirp are not considered. Laser chirp degrades the transmitted signal quality from two aspects: firstly, the laser response is distorted, and modulation bandwidth is narrowed; and secondly the phase response of the chirp will interact with chromatic dispersion and further reduce the transmission distance, which adds to a fundamental limitation to DML for long-distance transmission. Embodiments disclosed herein include methods based on coherent orthogonal frequency division multiplexing (OFDM) for laser chirp estimation and pre-compensation. These methods improve the operation bandwidth and transmission distance of optical communication systems incorporating directly modulated lasers, e. g., an OFFT, a coherent-optical-injection locked (COIL) laser, and intensity modulation and direct detection (IM-DD).

Introduction of Coherent OFDM

Figure 15:
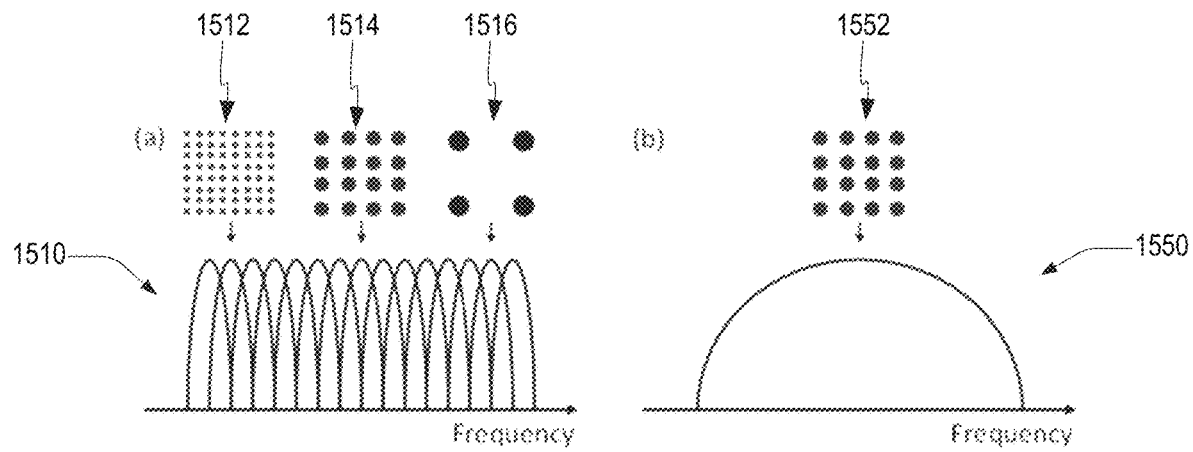
FIG. 15 is a schematic comparison of orthogonal frequency division multiplexing (OFDM) and single-carrier modulation.

Conceptual diagrams of OFDM and single-carrier (SC) modulation are shown in FIG. 15, which include an optical spectrum 1510 of carrier signals of an OFDM-modulated signal, an optical spectrum 1550 of a single-carrier modulated signal. FIG. 15 also depicts constellation diagrams 1512, 1514, and 1516 of modulation schemes that are simultaneously compatible with the OFDM-modulated signal, and a constellation diagram 1552 of a modulation scheme compatible with the single-carrier modulated signal.

The signal generation of SC is simple and straightforward. The digital signal processing (DSP) including carrier frequency offset (CFO) estimation, phase noise compensation, and channel equalization can be accomplished based on blind algorithms. As such, meaning that, the signal can be recovered based on the statistical property of them without utilizing training or pilots. SC is also featured by lower peak-to-average-power ratio (PAPR), thus showing higher resistance against nonlinear distortions from the electrical amplifiers.

Yet, SC modulation has drawbacks. Firstly, it suffers seriously from skew and timing offset among multiple data streams in coherent optical systems. Secondly, the complexity of the DSP is high, especially for CFO and carrier phase noise estimation. If high-order modulation formats beyond 16-ary quadrature amplitude modulation (QAM) are used, the blind DSP complexity becomes nearly intolerable. By contrast, as a multi-carrier modulation format, OFDM is distinguished by its higher spectral efficiency and flexibility, e. g., to load different modulation formats and power levels at different subcarriers.

When combining with pilots or training symbols, the DSP for eliminating CFO and phase noise becomes simpler and more effective. However, one of the major drawback of OFDM lies in its high PAPR, which requires a high-power electrical driver with a large dynamic range, thus reducing its power efficiency. However, this reduced efficiency could be mitigated through some DSP techniques, such as frequency-spread OFDM. The multi-carrier feature empowers OFDM as a good candidate for measuring system frequency-domain response. When adopting an appropriate subcarrier spacing, the frequency transmission curve can be measured and plotted with higher accuracy. In embodiments, by tracking the intensity and phase of each subcarrier, OFDM plus optical coherent detection is used to measure the chirp response of a DML.

Figure 16:
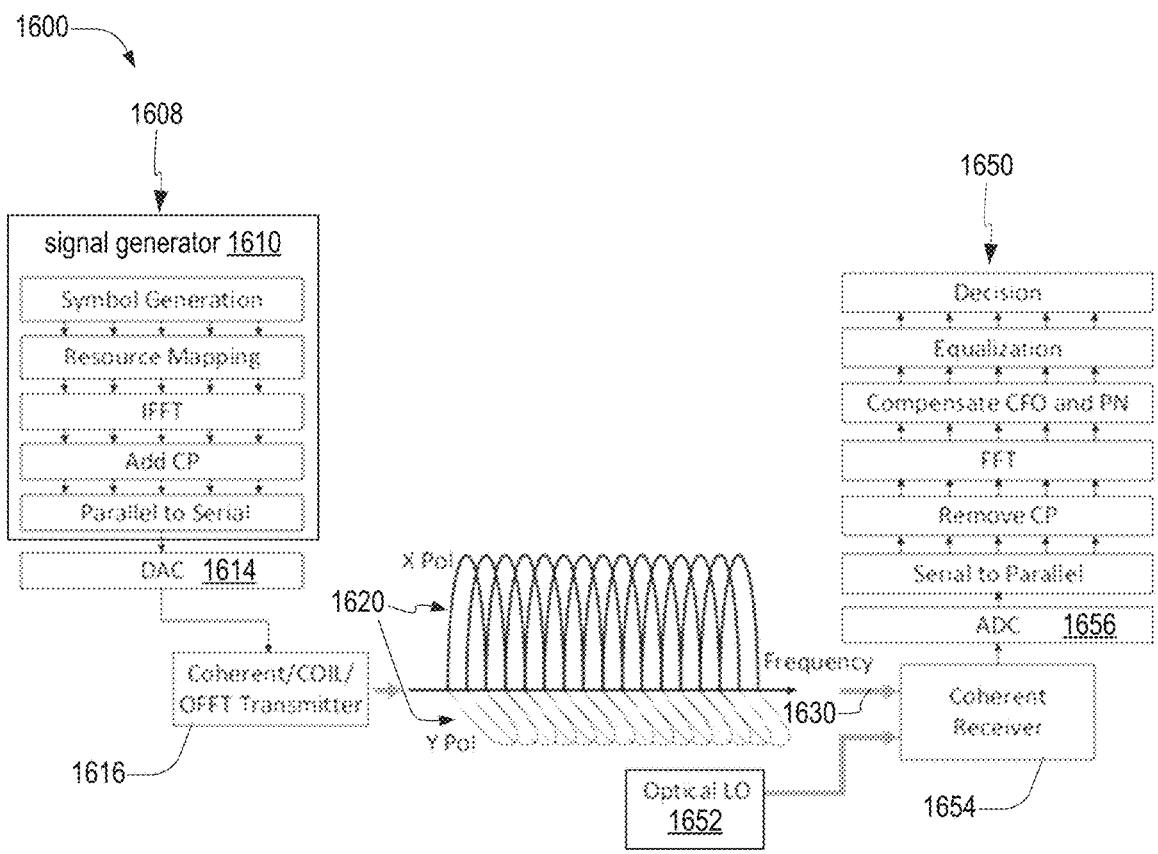
FIG. 16 is a schematic of a coherent OFDM system, in an embodiment.

FIG. 16 is a schematic of a coherent OFDM system 1600, which includes a transmitter site 1608 and a receiver 1650. Transmitter 1608 includes a signal generator 1610, a digital-to-analog converter (DAC) 1614, and coherent transmitter 1616. In embodiments, coherent transmitter 1616 is or includes at least one of an IQ modulator, a coherent-optical-injection-locked (COIL) transmitter, and an OFFT. Signal generator 1610 an example of signal generator 610. DAC 1614 may be part of signal generator 1610.

In an example mode of operation, at transmitter 1608, the first step is symbol generation and, to simplify the complexity in this system, QPSK format is applied. Then the symbols are mapped onto subcarriers. After applying an inverse fast Fourier transform (IFFT) and adding a cyclic prefix, the samples in parallel are converted into a waveform in serial and sent to DAC 1614. Electrical signals from DAC 1614 are modulated onto the light through coherent transmitter 1616 to yield a modulated optical signal 1620.

Receiver site 1650 includes an optical local oscillator 1652, coherent receiver 1654, and a digital-to-analog converter 1656. Modulated optical signal 1620 arrives at receiver 1650 as a modulated optical signal 1630, which is modulated optical signal 1620 with the addition of distortion caused by chirp and, in embodiments, also by chromatic dispersion. At receiver 1650, after modulated optical signal 1630 enters coherent receiver 1654, modulated optical signal 1620 light beats with optical local oscillator 1652 first, which projects the optical signal into four dimensions with two orthogonal phases and two polarizations, from which coherent receiver generates four streams of electrical signals, which ADC 1656 samples. The samples are converted from serial to parallel data blocks. The cyclic prefix is removed for each data block and an FFT is applied. After that, DSP techniques are applied to estimate the CFO, compensate the carrier phase noise, and equalize the channel response before making the final decisions to each symbol. It is worth noting that, because of the adoption of cyclic prefix, if the clock timing offset among the four data streams are within the cyclic prefix protection window, the timing offset may be totally compensated within each data block. Thus, the clock recovery of OFDM is much simpler than traditional single-carrier modulation at an expense of slightly increased overhead.

Figure 17:
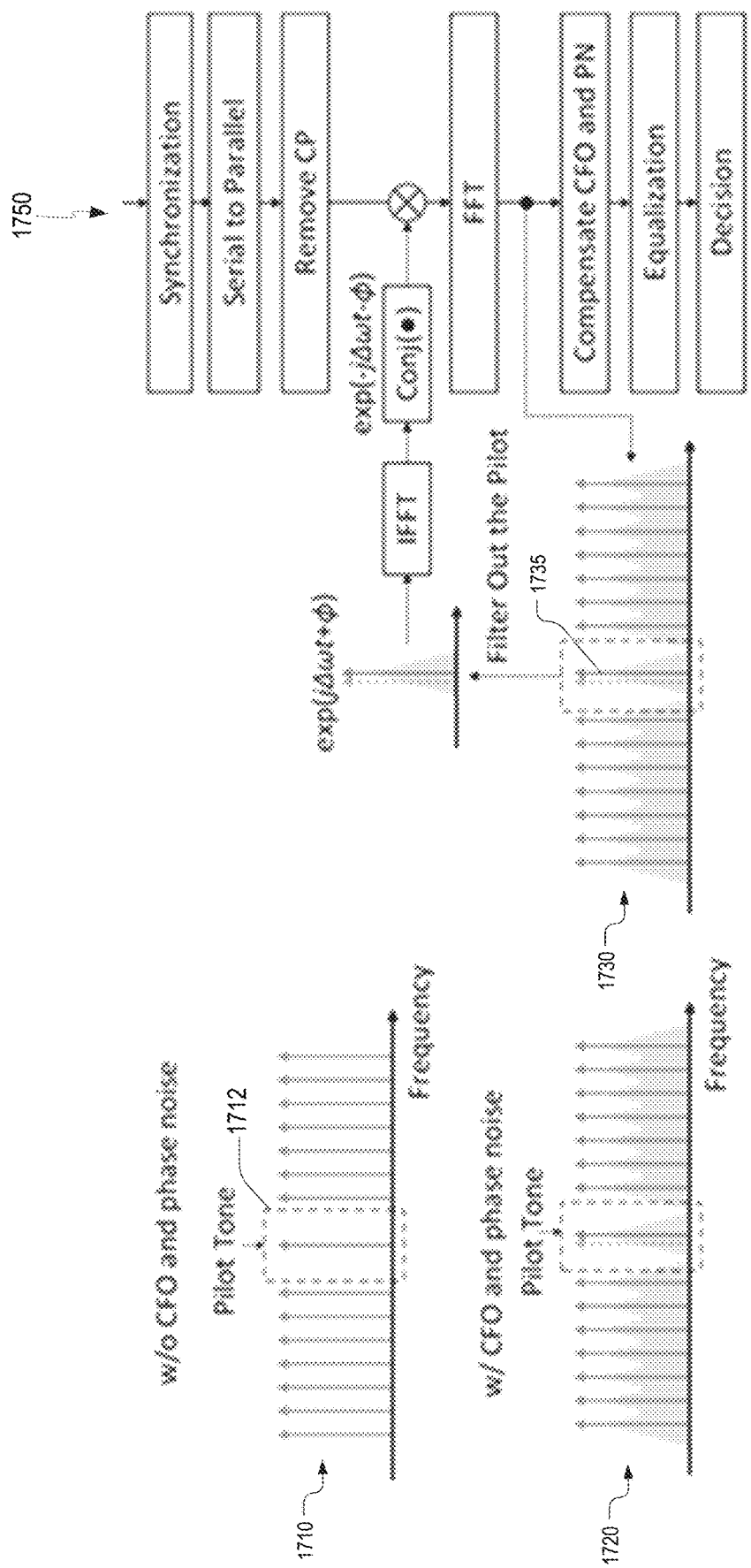
FIG. 17 is a schematic illustration of pilot configuration of a coherent OFDM signal, coherent optical OFDM signal under the influence of carrier frequency offset (CFO) and phase noise, and a digital signal processor for estimating and compensating for CFO and phase noise.

One of the key DSP techniques in optical OFDM is to estimate the CFO and phase noise. In embodiments, pilot tone-based carrier recovery is used for CFO and phase-noise compensation. FIG. 17 includes optical signals 1710, 1720, and 1730, and is a schematic illustration of pilot configuration of a coherent OFDM signal (optical signal 1710); a coherent optical OFDM signal under the influence of CFO and phase noise (optical signal 1720); and DSP for estimating and compensating for the CFO and phase noise (optical signal 1730). FIG. 17 also depicts signal processing steps 1750, which are examples of digital signal processing steps of associated with receiver 1650, FIG. 16.

In optical signal 1710, a direct-current (DC) component is introduced at the center of the OFDM signal in its spectrum. Between the DC component and the loaded subcarriers at the two side bands, some guard subcarriers remain unloaded to protect the central pilot tone from loaded subcarriers' interference. Optical signal 1710 includes a pilot tone 1712.

After transmission pilot tone 1712 along an optical link and exposure of pilot tone 1710 to the CFO and phase noise, the bandwidth of pilot tone 1712 is slightly broadened because random sideband components are introduced by the phase noise, as shown by optical signal 1720. Optical signal 1720 is also slightly deviated from the DC because of the CFO. The procedures for CFO and phase noise compensation are shown in processing steps 1750, which are based on the DSP flows of a coherent OFDM receiver of receiver 1650 in FIG. 16.

Optical signal 1730 includes a central pilot tone 1735. After transforming optical signal 1730 into frequency domain through an FFT, for each data block, the position of the central pilot is located through peak search and a low-pass digital filter is applied to filter out central pilot tone 1735 along with the phase-noise side bands surrounding itself. Then an IFFT is executed to inversely convert central pilot tone 1735 into time domain, which contains the CFO and phase-noise information in time domain. After taking the conjugate of the time-domain pilot component and multiplying it back to the corresponding buffered data block before FFT, the CFO and phase noise are cancelled, and, after FFT, the signal may be processed for channel response equalization and decisioning.

Figure 18:
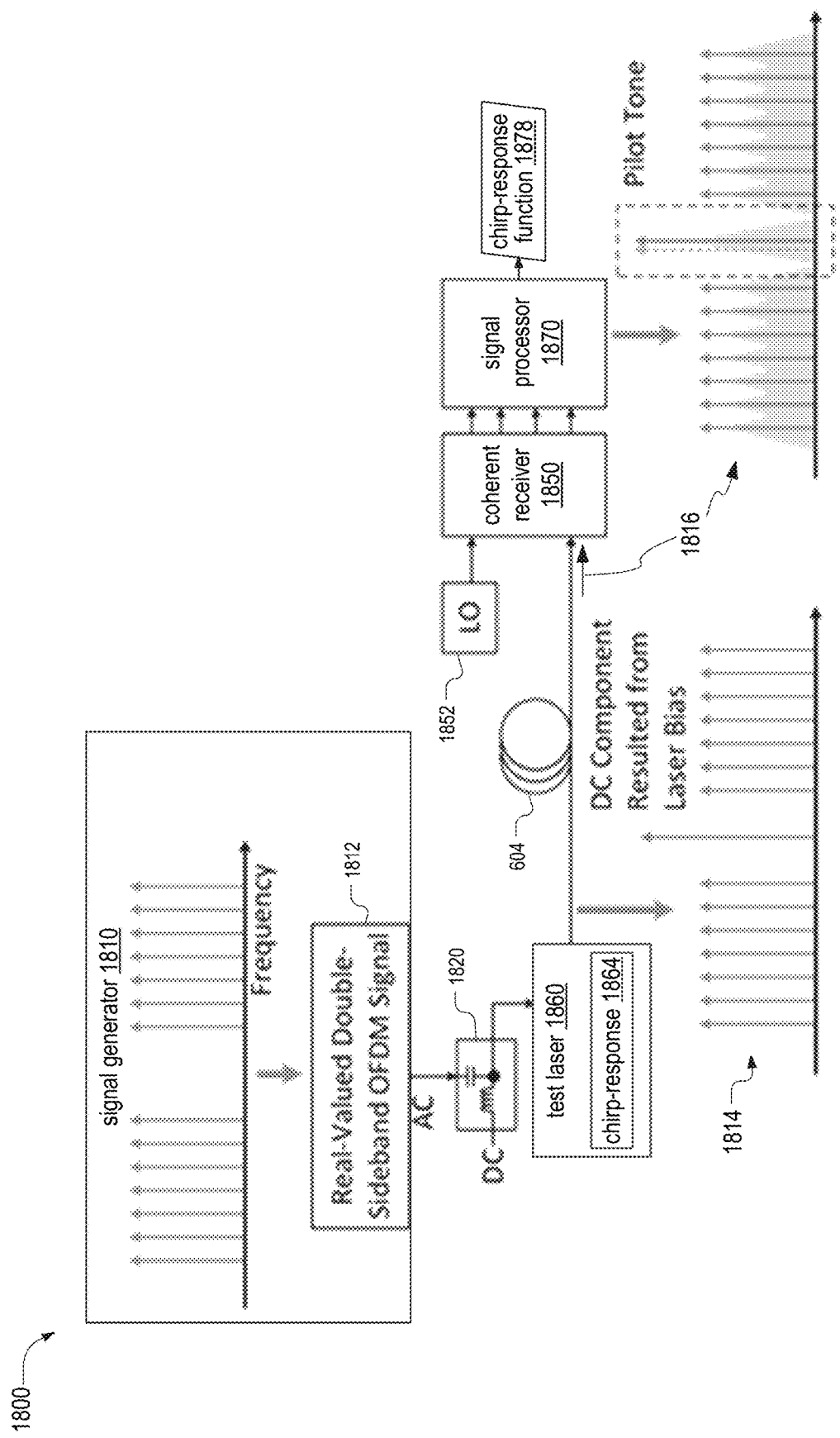
FIG. 18 is a schematic of a laser-chirp measurement system, in an embodiment.

FIG. 18 is a schematic of a laser-chirp measurement system 1800, which includes a signal generator 1810, a test laser 1860, fiber-optic cable 604, a coherent receiver 1850, a local oscillator 1852, and a signal processor 1870. In embodiments, system 1800 also includes a bias-tee 1820. Signal generator 1810 is an example of signal generator 610, and may include bias-tee 1820.

In an example mode of operation, signal generator 1810 produces a real-valued double-sideband OFDM signal 1812. Since test laser 1860 only converts the electrical signal to the intensity fluctuations of the light, only the real-part of OFDM signal 1812 is sent to an alternating-current (AC) port of bias-tee 1820. It is worth noting that, after the offline signal generation, there is no DC component for the signal. However, when test laser 1860 is biased at the linear operation region, after modulating onto the light, a DC component will be automatically introduced at the center of the signal in frequency domain, which is equivalent to a pilot tone added offline. In an OFDM signal recovery process, this central pilot subcarrier may be located and filtered out to compensate the CFO and phase noise based on the algorithms described in herein.

Test laser 1860 has a chirp response 1864, which laser-chirp measurement system 1800 estimates as a chirp-response function 1878. Laser-chirp measurement system 1800 is described in further detail below as part of a description of a method 2300 for measuring a chirp-response of a laser.

Methods of Laser Chirp Estimation

When driven by an external small electrical signal, the frequency chirp response $H_F(f)$ for the cavity of a semiconductor laser may be determined by the rate equation description of the modulation dynamics, which per reference [1] can be written as $$H_F(f) = \frac{Z}{(j2\pi f)^2 + j2\pi f Y + Z} \quad (1)$$

$$y = g_0 \frac{\overline{S}}{1+\varepsilon\overline{S}} + \frac{1}{\tau_n} - \Gamma g_0(\overline{N} - N_t) \frac{1}{(1+\varepsilon\overline{S})^2} + \frac{1}{\tau_p} \quad (2)$$

$$Z = g_0 \frac{\overline{S}}{(1+\varepsilon\overline{S})} \frac{1}{\tau_p} + (\beta-1) \frac{\Gamma g_0(\overline{N}-N_t)}{\tau_n} \frac{1}{(1+\varepsilon\overline{S})^2} + \frac{1}{\tau_n \tau_p}, \quad (3)$$

where $\overline{N}$ is the steady-state value of carrier density, $\overline{S}$ is the steady-state value of photon density, $f$ is the frequency of the modulation signal, $\varepsilon$ is the gain compression factor, $\tau_p$ is the photon life time, $\tau_n$ is the electron life time, $\vartheta_0$ is the gain slope constant, and $\Gamma$ is the mode confinement. In the following simulation, the values of Y and Z are set to be $55.87 \times 10^9$ s$^{-1}$ and $55.52 \times 10^{20}$ Hz$^2$, respectively. The curves of the simulated laser chirp amplitude and phase responses are shown in power-response plot 1910 and phase-response plot 1920 of FIG. 19 respectively. The effective bandwidth is around 15 GHz. However, it is observed that except from the distortions in the intensity, the phase rotations are also different for different frequency component. After long-distance fiber transmission, the phase differences will jointly work together with chromatic dispersion and thus further distorting the channel response. Because of the phase rotations, such distortion induced by laser-chirp dynamics cannot be eliminated through intensity compensation only. Nevertheless, a cascaded DML plus phase modulator structure in an OFFT enables mitigation of the chirp degradations via manipulation and pre-distortion of the signal's phase and pre-compensation of the signal's shape in intensity.

Figure 20:
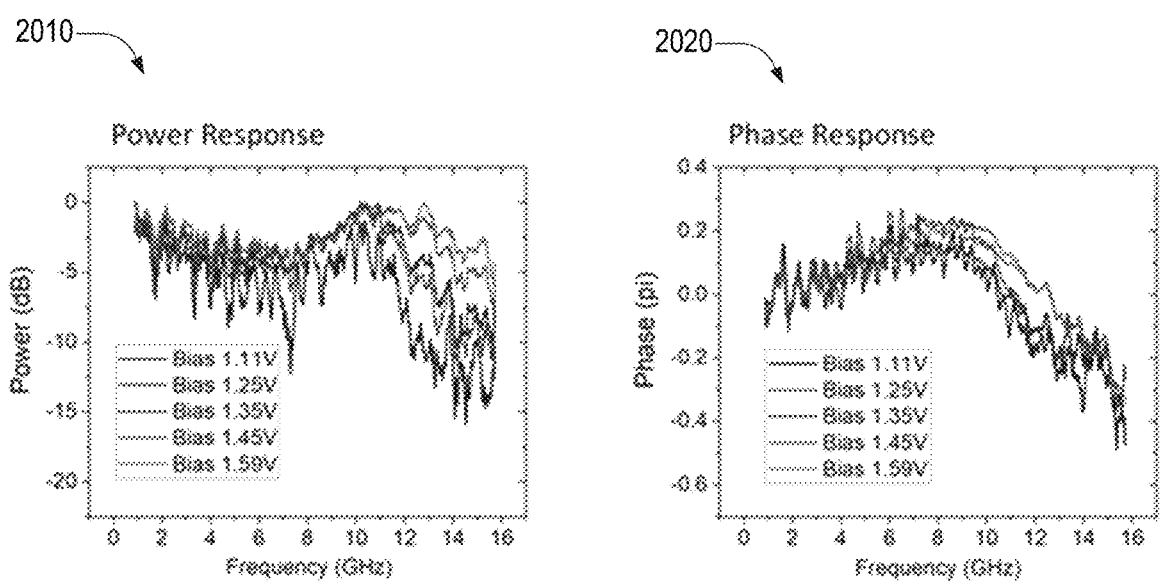
FIG. 20 includes graphs of measured laser-chirp amplitude and phase responses, in an embodiment.

FIG. 20 depicts measured intensity responses 2010 and measured phase responses 2020 of laser chirp as measured by laser-chirp measurement system 1800, FIG. 18, in which the transmitter device under test—an example of test laser 1860, is a Fabry-Perot laser under coherent injection-locking in a COIL system. For each bias voltage of FIG. 20, the combination of the corresponding measured intensity response 2010 and the corresponding measured phase response 2020 is an example of chirp-response function 1878 determined by laser-chirp measurement system 1800.

In the example of FIG. 20, the operation wavelength is around 1561 nm and the injecting power is fixed at around 2-dBm. As shown by measured intensity responses 2010, the operation bandwidth in intensity domain is enlarged with a higher bias voltage. The estimated modulation bandwidths are around 12 GHz and 16 GHz under bias voltages of 1.11 V and 1.45 V respectively. It can be found that the general trends of the curve basically match the tendency shown in power-response plot 1910, FIG. 19. By contrast, measured phase responses 2020, each under different voltages, are basically overlapped, which proves that the phase response is not sensitive towards changes of bias voltage.

Joint Chirp and Chromatic Dispersion Compensation

FIGS. 6-14 describe DSP techniques in an OFFT site to pre-compensate the chromatic dispersion after long-distance-fiber transmission. However, when a direct-modulated laser is used in the system, the chromatic dispersion will interact with the chirp of the laser, which further degrades the signal quality. A single-stage chromatic dispersion precompensation cannot totally mitigate the transmission distortions because the chirp is not considered.

Figure 19:
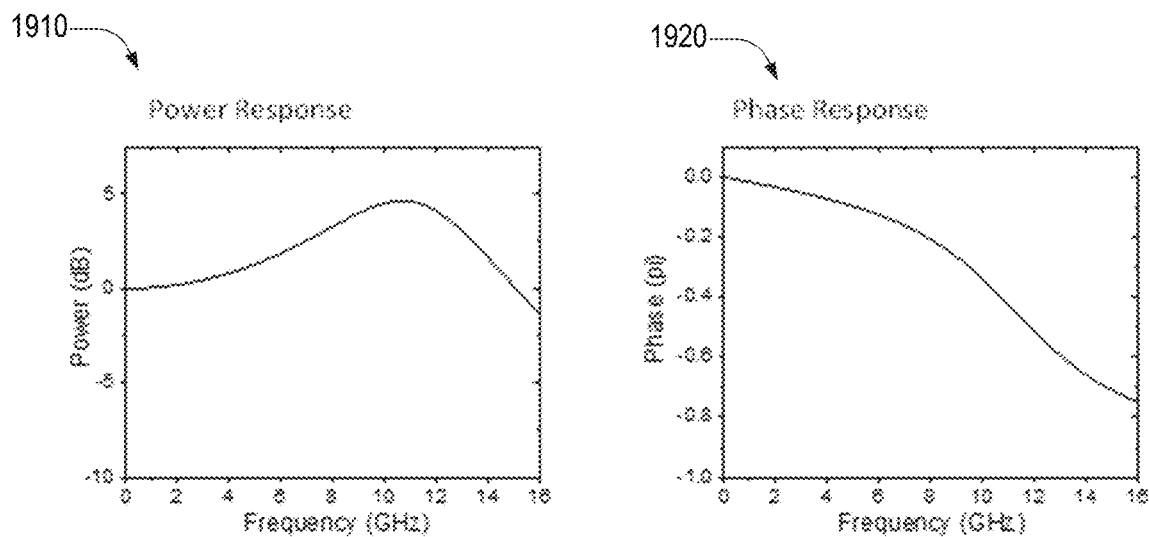
FIG. 19 includes graphs of computed laser-chirp amplitude and phase responses, in an embodiment.
Figure 21:
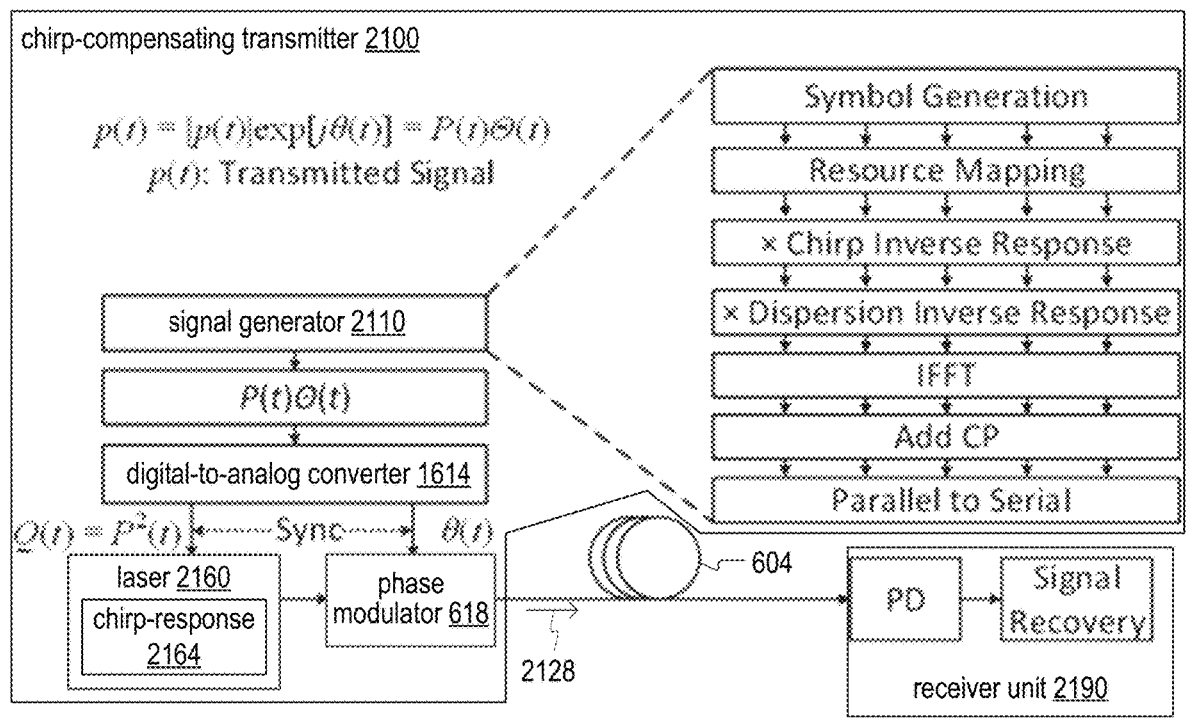
FIGS. 21 and 22 are respective schematic diagrams of a chirp-compensating transmitters, in embodiments.

With embodiments of the coherent optical OFDM technique to measure the chirp response of the laser under modulation shown in FIGS. 18-20, the distortion precompensation of FIGS. 6-14 can be extended to jointly compensate for chirp and chromatic dispersion. FIG. 21 is a schematic diagram of a chirp-compensating transmitter 2100 that transmits a chirp-compensated optical signal 2128 to a receiver unit 2190. Chirp-compensating transmitter 2100 includes signal generator 2110, DAC 1614, a laser 2160, and phase modulator 618. In embodiments, laser 2160 is a directly-modulated laser, and may also be a coherent-optical-injection locked laser.

Laser 2160 has a chirp response 2164. In embodiments of laser-chirp measurement system 1800, test laser 1860 is identical to laser 2160 such that chirp-response 2164 has been measured by laser-chirp measurement system 1800, which outputs chirp-response function 1878. Measured intensity responses 2010 and measured phase responses 2020, FIG. 20 are example measurements of chirp-response 2164.

As shown in FIG. 21, after modelling of the chirp and chromatic-dispersion responses, they are inversed and multiplied, by signal generator 2110, to the corresponding data block subsequently in frequency domain. After the signal generation process, the compensated signal, represented by p(t), is decomposed into an intensity component P(t) and a phase component θ(t), which will be modulated onto laser 2160 and phase modulator 618 respectively, which will cooperate to cancel both chirp induced by direct modulation and phase distortion induced by fiber-optic cable 604. In the frequency domain, the compensated signal P(ω) equals $H_c^{-1}(\omega)S(\omega)$, where $H_c(\omega)$ is a transfer function that includes distortion effects of chirp and, in embodiments, also chromatic dispersion. S(ω) is a frequency-domain representation of a modulated signal without precompensation. Transfer function $H_c(\omega)$ is an example of transfer function H(ω), the inverse of which is stored in embodiments of memory 704 of signal generator 710. Transfer function $H_c(\omega)$ is also an example of chirp-response function 1878.

Embodiments disclosed herein describe the use of a coherent optical OFDM signal to measure the chirp response in a DML, such a directly modulated laser of a COIL transmitter or an OFFT. An efficient DSP technique to estimate and mitigate the CFO and phase noise in coherent optical OFDM is also applied. The experimental results of measured chirp responses are basically matched with the existing theoretical studies. With the tool for chirp measurement and estimation, it is enabled to further extend the embodiments of FIGS. 6-14 to jointly pre-compensate the penalties brought by the interactions between chromatic dispersion and chirp, which further improves the signal quality after fiber transmission in an IM-DD, COIL, or an OFFT system.

Figure 22:
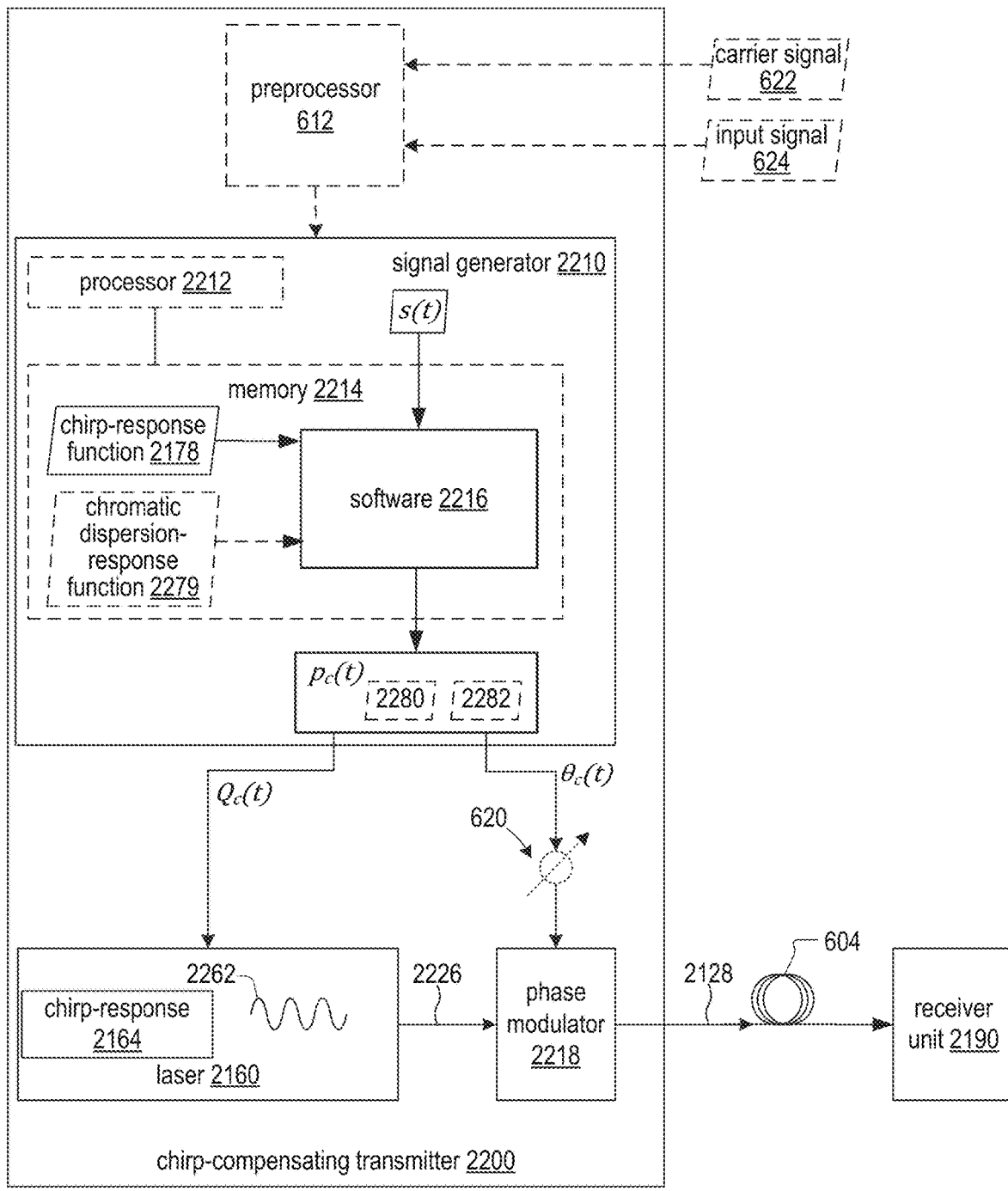

FIG. 22 is a schematic of a chirp-compensating transmitter 2200, which is an embodiment of dispersion-compensating transmitter 602, FIG. 6. Chirp-compensating transmitter 2200 includes a signal generator 2210, laser 2160, and a phase modulator 2218, which are respective examples of signal generator 610, laser 616, and phase modulator 618 of dispersion-compensating transmitter 602, FIG. 6. In embodiments, chirp-compensating transmitter 2200 also includes tunable delay line 620.

Signal generator 2210 is configured to distort original modulated signal s(t) according to an inverse of chirp-response function 2178, to yield a chirp-compensated signal $p_c(t)$, which has an amplitude $Q_c(t)$ and a phase $θ_c(t)$. In embodiments, signal generator 2210 is also configured to distort original modulated signal s(t) by an inverse of a chromatic dispersion response function 2279, of which H(ω) is an example. Chirp-compensated signal $p_c(t)$, herein also referred to a chirp-compensated signal 2280, as an example of chirp-compensated optical signal 2128.

Chirp-response function 2178 is an estimate of chirp response 2164 of laser 2160, and is an example of chirp-response function 1878, produced by laser-chirp measurement system 1800. In embodiments, signal generator 2210 generates original modulated signal s(t). In other embodiments, chirp-compensating transmitter 2200, includes preprocessor 612, from which signal generator 2210 receives original modulated signal s(t).

In chirp-compensating transmitter 2200, laser 2160 is configured to modulate an amplitude of an optical signal 2262 in response to an amplitude of one of (i) chirp-compensated signal $p_c(t)$ and (ii) a signal derived therefrom, to yield an amplitude-modulated signal 2226. Phase modulator 2218 is disposed downstream of laser 2160 with respect to optical signal 2262. Phase modulator 2218 is configured to modulate a phase of amplitude-modulated signal 2226 in response to (i) one of phase $θ_c(t)$ of chirp-compensated signal 2280 ($p_c(t)$) and (ii) a phase of a signal derived from chirp-compensated signal 2280 ($p_c(t)$).

In embodiments, original modulated signal s(t) is modulated over a range of modulation frequencies, and at least one an amplitude and a phase of chirp-response 2164 varies over the range of modulation frequencies. An example range of modulation frequencies is between one and sixteen GHz, or a subrange therein.

Signal generator 2210 may be a digital signal generator. For example, in embodiments, signal generator 2210 includes a processor 2212 and a memory 2214. Memory 2214 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 2214 may be integrated into processor 2212. Memory 2214 stores machine readable instructions, shown as software 2216. When executed by processor 2212, software 2216 controls processor 2212 to generate chirp-compensated signal $p_c(t)$ by distorting original modulated signal s(t) according to the inverse of chirp-response 2164. In embodiments, memory 2214 stores estimated chirp-response function 2178, which may be calculated values, as in FIG. 19, measured values, as in FIG. 20, or a combination thereof.

In embodiments, chirp-response function 2178 is an analytical expression that is a function of a modulation frequency of the original modulation signal and one or more characteristics of laser 2160. The characteristics include at least one of: a steady-state value of carrier density, a steady-state value of photon density, a gain compression factor, a characteristic photon life time, a characteristic electron life time, a gain slope constant, and a mode confinement parameter. An example of the analytical expression is frequency chirp response $H_F(f)$ of equation (1).

FIG. 23 is a flowchart illustrating method 2300 for measuring a chirp-response of a laser. Method 2300 may be implemented with laser-chirp measurement system 1800, FIG. 18. Method 2300 includes steps 2310, 2320, 2330, 2340, and 2350.

Step 2310 includes modulating the laser with a real-valued double-side-band orthogonal frequency-domain multiplexed (OFDM) signal to yield a characterization optical signal that includes a plurality of subcarriers each including a respective transmitted amplitude and a respective transmitted phase. In an example of step 2310, signal generator 1810 modulates test laser 1860 with signal 1812 to yield a characterization signal 1814.

Step 2320 includes transmitting the characterization optical signal to a coherent receiver via a fiber-optic cable. In an example of step 2320, signal 1812 is transmitted to coherent receiver 1850 via fiber-optic cable 604.

Step 2330 includes receiving, at the coherent receiver, the characterization optical signal as a chirped-modulated optical signal. In an example of step 2330, coherent receiver 1850 receives a chirp-modulated signal 1816.

Step 2340 includes demodulating the chirped-modulated optical signal to obtain, for each subcarrier of the plurality of subcarriers, a respective received amplitude and a respective received phase. In an example of step 2340, coherent receiver demodulates chirp-modulated signal 1816 to obtain, or each subcarrier of the plurality of subcarriers of signal 1812, a respective received amplitude and a respective received phase.

Step 2350 includes, for each subcarrier of the plurality of subcarriers, (i) determining a respective chirp-response amplitude of a plurality chirp-response amplitudes of the chirp-response function as a ratio of the respective received amplitude to the respective transmitted amplitude, and (ii) determining a respective chirp-response phase of a plurality chirp-response phases of the chirp-response function as a difference between the respective received phase to the respective transmitted phase. In an example of step 2350, signal processor 1870 determines chirp-response function 1878. In embodiments, chirp-response function 1878 includes a plurality chirp-response amplitudes of measured intensity responses 2010 and a plurality chirp-response phases of measured phase responses 2020, FIG. 20.

Figure 24:
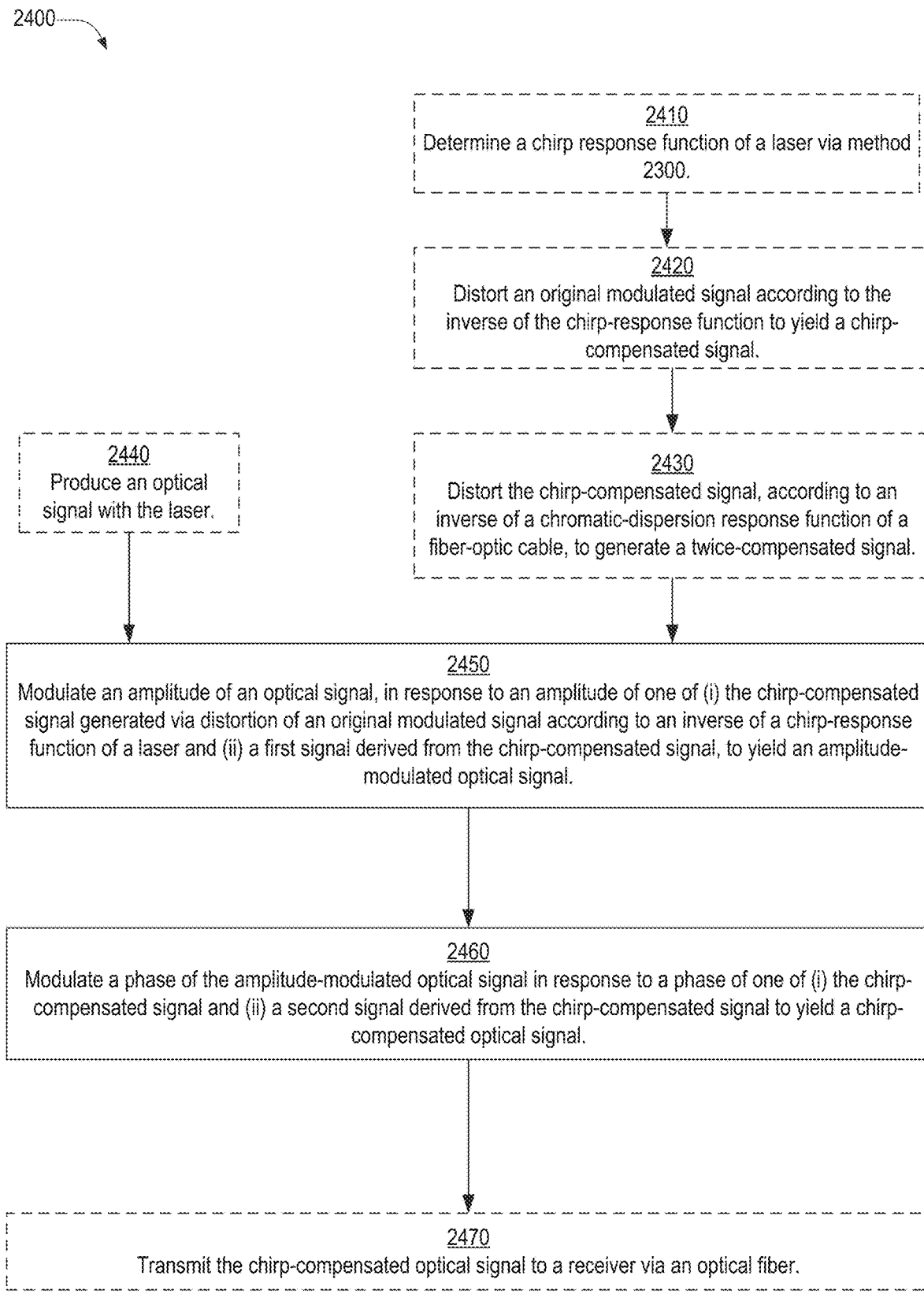
FIG. 24 is a flowchart illustrating a method for laser chirp precompensation, in an embodiment.

FIG. 24 is a flowchart illustrating a method 2400 for laser chirp precompensation. Method 2400 includes steps 2450 and 2460. In embodiments, method 2400 also includes at least one of steps 2410, 2420, 2430, 2440, and 2470. Method 2400 may be implemented by chirp-compensating transmitter 2200.

Step 2410 includes determining a chirp-response function by executing method 2300. In an example of step 2410, laser-chirp measurement system 1800 outputs chirp-response function 2178.

Step 2420 includes distorting an original modulated signal according to the inverse of the chirp-response function to yield a chirp-compensated signal. In an example of step 2420, signal generator 2210 distorts original modulated signal s(t) according to an inverse of chirp-response function 2178 to yield chirp-compensated signal 2280.

Step 2430 includes distorting the chirp-compensated signal, according to an inverse of a chromatic-dispersion response function of a fiber-optic cable, to generate a twice-compensated signal. In an example of step 2430, signal generator 2210 distorts chirp-compensated signal 2280 according to chromatic dispersion-response function 2279, which yields a twice-compensated signal 2282 that is precompensated for both chirp and chromatic dispersion. In embodiments, the chirp-precompensation of step 2420 precedes the chromatic dispersion precompensation of step 2430, while in other embodiments, step 2430 precedes step 2420, or steps 2420 and 2430 are executed in a single step. When method 2400 includes step 2430, $p_c(t)$ represents twice-compensated signal 2282.

Step 2440 includes producing an optical signal with the laser. In an example of step 2440, laser 2160 produces optical signal 2262.

Step 2450 includes modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal. Step 2450 may include directly modulating the laser, e.g., signal generator 2210 may directly modulate laser 2160.

In a first example of step 2450, signal generator 2210 modulates an amplitude of optical signal 2262 according to an amplitude of chirp-compensated signal 2280 to yield amplitude-modulated signal 2226. In a second example of step 2450, applicable when method 2400 includes step 2430, signal generator 2210 modulates an amplitude of optical signal 2262 according to an amplitude of twice-compensated signal 2282 to yield amplitude-modulated signal 2226.

Step 2460 includes modulating a phase of the amplitude-modulated optical signal in response to a phase of one of (i) the chirp-compensated signal and (ii) a second signal derived from the chirp-compensated signal. In a first example of step 2460, phase modulator 2218 modulates a phase of amplitude-modulated signal 2226 according to a phase of chirp-compensated signal 2280 to yield chirp-compensated optical signal 2128. In a second example of step 2450, applicable when method 2400 includes step 2430, phase modulator 2218 modulates a phase of amplitude-modulated signal 2226 according to a phase of twice-compensated signal 2282 to yield chirp-compensated optical signal 2128.

Step 2470 includes transmitting the chirp-compensated optical signal to a receiver via a fiber-optic cable. In an example of step 2470, chirp-compensating transmitter transmits chirp-compensated optical signal 2128 to receiver unit 2190 via fiber-optic cable 604.

Combinations of Features

Features described above as well as those claimed below may be combined in various ways without departing from the scope hereof. The following enumerated examples illustrate some possible, non-limiting combinations.

(A1) A method of determining a chirp-response function of a laser includes the following steps (a)-(e). Step (a) includes modulating the laser with a real-valued double-side-band orthogonal frequency-domain multiplexed (OFDM) signal to yield a characterization optical signal that includes a plurality of subcarriers each including a respective transmitted amplitude and a respective transmitted phase. Step (b) includes transmitting the characterization optical signal to a coherent receiver via a fiber-optic cable. Step (c) includes receiving, at the coherent receiver, the characterization optical signal as a chirped-modulated optical signal. Step (d) includes demodulating the chirped-modulated optical signal to obtain, for each subcarrier of the plurality of sub carriers, a respective received amplitude and a respective received phase. Step (e) includes for each subcarrier of the plurality of subcarriers, (i) determining a respective chirp-response amplitude of a plurality chirp-response amplitudes of the chirp-response function as a ratio of the respective received amplitude to the respective transmitted amplitude, and (ii) determining a respective chirp-response phase of a plurality chirp-response phases of the chirp-response function as a difference between the respective received phase to the respective transmitted phase.

(B1) A method for laser chirp precompensation includes modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal. The method also includes modulating a phase of the amplitude-modulated optical signal in response to a phase of one of (i) the chirp-compensated signal and (ii) a second signal derived from the chirp-compensated signal to yield a chirp-compensated optical signal.

(B2) In embodiments, method (B1) includes distorting the original modulated signal according to the inverse of the chirp-response function to yield the chirp-compensated signal.

(B3) In embodiments of either of methods (B1) and (B2), at least one of an amplitude and a phase of the chirp-response function varies over a range of modulation frequencies of the original modulated signal.

(B4) In embodiments of any one of methods (B1)-(B3), chirp-response function is an analytical expression that is a function of a modulation frequency of the original modulation signal and a number of characteristics of the laser that includes at least one of: a steady-state value of carrier density, a steady-state value of photon density, a gain compression factor, a characteristic photon life time, a characteristic electron life time, a gain slope constant, and a mode confinement parameter.

(B5) In embodiments of any one of methods (B1)-(B4), distorting includes one of (i) multiplying a frequency-domain representation of the original modulated signal by a frequency-domain representation of the chirp-response function, and (ii) convolving a time-domain representation of the original modulated signal by a time-domain representation of the chirp-response function.

(B6) Embodiments of any one of methods (B1)-(B5) further include transmitting the chirp-compensated optical signal to a receiver via a fiber-optic cable.

(B7) In embodiments of any one of methods (B1)-(B6), the original modulated signal being a non-optical signal.

(B8) Embodiments of any one of methods (B1)-(B7) further include producing the optical signal with the laser.

(B9) In embodiments of method (B8), modulating the amplitude of the optical signal includes directly modulating the laser.

(B10) Embodiments of any one of methods (B1)-(B9) further include distorting the chirp-compensated signal, according to an inverse of a chromatic-dispersion response function of a fiber-optic cable, to generate a twice-compensated signal. Said modulating the amplitude of the optical signal includes modulating the amplitude of the optical signal in response to an amplitude of the twice-compensated signal. Said modulating the phase of the amplitude-modulated optical signal comprising modulating the phase of the amplitude-modulated optical signal in response to a phase of the twice-compensated signal.

(B11) Embodiments of method (B10) further includes, when modulating the phase of the amplitude-modulated optical signal yields an as-transmitted optical signal, transmitting the as-transmitted optical signal to a receiver via the fiber-optic cable.

(B12) Embodiments of any one of methods (B1)-(B10) further include determining the chirp-response function via method (A1).

(C1) A chirp-compensating transmitter includes a signal generator, a laser, and a phase modulator. The signal generator is configured to distort an original modulated signal according to an inverse of a chirp-response function of a laser, to yield a chirp-compensated signal. The laser is configured to modulate an amplitude of an optical signal in response to an amplitude of one of (i) the chirp-compensated signal and (ii) a first signal derived therefrom, to yield an amplitude-modulated optical signal. The phase modulator is disposed downstream of the laser with respect to the optical signal, and is configured to modulate a phase of the amplitude-modulated optical signal in response to a phase of one of (i) the chirp-compensated signal and (ii) a second signal derived therefrom.

(C2) In embodiments of transmitter (C1) the original modulated signal being modulated over a range of modulation frequencies, at least one an amplitude and a phase of the chirp-response function varying over the range of modulation frequencies.

(C3) In embodiments of either of transmitters (C1) and (C2), the laser is a directly-modulated laser.

(C4) In embodiments of any one of transmitters (C1)-(C3), the laser is a coherent-optical-injection locked laser.

(C5) In embodiments of any one of transmitters (C1)-(C4), the signal generator is a digital signal generator.

(C6) In embodiments of any one of transmitters (C1)-(C5), the signal generator includes a processor and a memory. The memory stores machine readable instructions that when executed by the processor, control the processor to generate the chirp-compensated signal by distorting the original modulated signal according to the inverse of the chirp-response function.

(C7) In embodiments of any one of transmitter (C6), the chirp-response function is an analytical expression that is a function of a modulation frequency of the original modulation signal and one or more characteristics of the laser. The characteristics includes at least one of: a steady-state value of carrier density, a steady-state value of photon density, a gain compression factor, a characteristic photon life time, a characteristic electron life time, a gain slope constant, and a mode confinement parameter. The memory stores the analytical expression and the characteristics of the laser.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

REFERENCES

[1] J. C. Cartledge, and R. C. Srinivasan, "Extraction of DFB laser rate equation," *J. Lightw. Technol.*, vol. 15, no. 5, pp. 852-860, May 1997.

What is claimed is:

1. A method for laser chirp precompensation comprising:
   modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal;
   modulating a phase of the amplitude-modulated optical signal in response to a phase of one of (i) the chirp-compensated signal and (ii) a second signal derived from the chirp-compensated signal to yield a chirp-compensated optical signal; and
   distorting the chirp-compensated signal, according to an inverse of a chromatic-dispersion response function of a fiber-optic cable, to generate a twice-compensated signal,
   said modulating the amplitude of the optical signal comprising modulating the amplitude of the optical signal in response to an amplitude of the twice-compensated signal;
   said modulating the phase of the amplitude-modulated optical signal comprising modulating the phase of the amplitude-modulated optical signal in response to a phase of the twice-compensated signal.

2. The method of claim 1, at least one of an amplitude and a phase of the chirp-response function varying over a range of modulation frequencies of the original modulated signal.

3. The method of claim 1, further comprising transmitting the chirp-compensated optical signal to a receiver via the fiber-optic cable.

4. The method of claim 1, the original modulated signal being a non-optical signal.

5. The method of claim 1, further comprising producing the optical signal with the laser.

6. The method of claim 5, modulating the amplitude of the optical signal comprising directly modulating the laser.

7. The method of claim 1, wherein modulating the phase of the amplitude-modulated optical signal yields an as-transmitted optical signal, and further comprising transmitting the as-transmitted optical signal to a receiver via the fiber-optic cable.

8. The method of claim 1, wherein the fiber-optic cable is implemented with one or more of a data center intraconnection, a data center interconnection, a mobile network, a building, and a single networking appliance.

9. The method of claim 1, further comprising modulating only an amplitude of a carrier signal to yield the original modulated signal.

10. The method of claim 1, further comprising amplitude-modulating and phase-modulating a carrier signal to yield the original modulated signal.

11. A method of determining a chirp-response function of a laser, comprising:
    modulating the laser with a real-valued double-side-band orthogonal frequency-domain multiplexed (OFDM) signal to yield a characterization optical signal that includes a plurality of subcarriers each including a respective transmitted amplitude and a respective transmitted phase;
    transmitting the characterization optical signal to a coherent-receiver;
    receiving, at the coherent receiver, the characterization optical signal as a chirped-modulated optical signal;
    demodulating the chirped-modulated optical signal to obtain, for each subcarrier of the plurality of subcarriers, a respective received amplitude and a respective received phase; and
    for each subcarrier of the plurality of subcarriers, (i) determining a respective chirp-response amplitude of a plurality chirp-response amplitudes of the chirp-response function as a ratio of the respective received amplitude to the respective transmitted amplitude, and (ii) determining a respective chirp-response phase of a plurality chirp-response phases of the chirp-response function as a difference between the respective received phase to the respective transmitted phase.

12. The method of claim 11, transmitting comprising transmitting the characterization optical signal to the receiver via a fiber-optic cable.

13. The method of claim 11, transmitting comprising transmitting the characterization optical signal to the receiver via a free-space.

14. A chirp-compensating transmitter comprising:
    a signal generator including (i) a processor and (ii) a memory storing machine readable instructions that, when executed by the processor, control the processor to generate a chirp-compensated signal by distorting an original modulated signal according to an inverse of a chirp-response function of a laser, to yield a chirp-compensated signal;
    a laser configured to modulate an amplitude of an optical signal in response to an amplitude of one of (i) the chirp-compensated signal and (ii) a first signal derived therefrom, to yield an amplitude-modulated optical signal; and
    a phase modulator disposed downstream of the laser with respect to the optical signal, the phase modulator being configured to modulate a phase of the amplitude-modulated optical signal in response to a phase of one of (i) the chirp-compensated signal and (ii) a second signal derived therefrom.

15. The transmitter of claim 14, the original modulated signal being modulated over a range of modulation frequencies, at least one an amplitude and a phase of the chirp-response function varying over the range of modulation frequencies.

16. The transmitter of claim 14, the laser being a directly-modulated laser.

17. The transmitter of claim 14, the laser being a coherent-optical-injection locked laser.

18. The transmitter of claim 14, the signal generator being a digital signal generator.

19. The transmitter of claim 14,
the chirp-response function being an analytical expression that is a function of a modulation frequency of the original modulation signal and one or more characteristics of the laser, the characteristics including at least one of: a steady-state value of carrier density, a steady-state value of photon density, a gain compression factor, a characteristic photon life time, a characteristic electron life time, a gain slope constant, and a mode confinement parameter;
the memory storing the analytical expression and the characteristics of the laser.

20. The method of claim 14, further comprising modulating only an amplitude of a carrier signal to yield the original modulated signal.

21. The method of claim 14, further comprising amplitude-modulating and phase-modulating a carrier signal to yield the original modulated signal.

22. A method for laser chirp precompensation comprising:
modulating an amplitude of an optical signal, in response to an amplitude of one of (i) a chirp-compensated signal generated via distortion of an original modulated signal according to an inverse of a chirp-response function of a laser and (ii) a first signal derived from the chirp-compensated signal, to yield an amplitude-modulated optical signal; and
modulating a phase of the amplitude-modulated optical signal in response to a phase of one of (i) the chirp-compensated signal and (ii) a second signal derived from the chirp-compensated signal to yield a chirp-compensated optical signal,
the chirp-response function being an analytical expression that is a function of a modulation frequency of the original modulation signal and a number of characteristics of the laser that includes at least one of: a steady-state value of carrier density, a steady-state value of photon density, a gain compression factor, a characteristic photon life time, a characteristic electron life time, a gain slope constant, and a mode confinement parameter.

23. The method of claim 22, further comprising modulating only an amplitude of a carrier signal to yield the original modulated signal.

24. The method of claim 22, further comprising amplitude-modulating and phase-modulating a carrier signal to yield the original modulated signal.

25. A method for laser chirp precompensation comprising:
distorting an original modulated signal according to the inverse of a chirp-response function of a laser to yield a chirp-compensated signal, said distorting including one of (i) multiplying a frequency-domain representation of the original modulated signal by a frequency-domain representation of the inverse of the chirp-response function, and (ii) convolving a time-domain representation of the original modulated signal by a time-domain representation of the inverse of the chirp-response function;
modulating an amplitude of an optical signal, in response to an amplitude of one of (i) a chirp-compensated signal generated via distortion of the original modulated signal according to an inverse of the chirp-response function and (ii) a first signal derived from the chirp-compensated signal, to yield an amplitude-modulated optical signal; and
modulating a phase of the amplitude-modulated optical signal in response to a phase of one of (i) the chirp-compensated signal and (ii) a second signal derived from the chirp-compensated signal to yield a chirp-compensated optical signal.

26. The method of claim 25, further comprising modulating only an amplitude of a carrier signal to yield the original modulated signal.

27. The method of claim 25, further comprising amplitude-modulating and phase-modulating a carrier signal to yield the original modulated signal.

* * * * *